(12) United States Patent
Cui et al.

(10) Patent No.: US 10,873,074 B2
(45) Date of Patent: Dec. 22, 2020

(54) LARGE-VOLUME-CHANGE LITHIUM BATTERY ELECTRODES

(71) Applicant: The Board of Trustees of the Leland Stanford Junior University, Stanford, CA (US)

(72) Inventors: Yi Cui, Stanford, CA (US); Nian Liu, Stanford, CA (US); Zhenda Lu, Stanford, CA (US); Jie Zhao, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 14/506,345

(22) Filed: Oct. 3, 2014

(65) Prior Publication Data

US 2015/0099187 A1 Apr. 9, 2015

Related U.S. Application Data

(60) Provisional application No. 61/887,011, filed on Oct. 4, 2013.

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/134* (2013.01); *H01M 4/364* (2013.01); *H01M 4/386* (2013.01);
(Continued)

(58) Field of Classification Search
CPC ...... H01M 4/366; H01M 4/364; H01M 4/134; H01M 4/625; H01M 4/626; H01M 4/386; H01M 10/052
See application file for complete search history.

(56) References Cited

U.S. PATENT DOCUMENTS

| | | | | |
|---|---|---|---|---|
| 7,427,439 | B2 * | 9/2008 | Saito ..................... | C23C 16/029 428/336 |
| 7,514,369 | B2 * | 4/2009 | Li .......................... | C01B 33/02 428/613 |
| 2002/0074972 | A1 * | 6/2002 | Narang .................. | H01M 4/13 320/131 |

(Continued)

FOREIGN PATENT DOCUMENTS

| CN | 102214817 | * 10/2011 | .......... H01M 4/1395 |
|---|---|---|---|
| JP | 2003-100284 | * 4/2003 | ............. H01M 4/02 |

(Continued)

OTHER PUBLICATIONS

BADIDAO Product Literature [BADIDAO] (Badidao website © 2007 online evidence per Wayback posting Oct. 11, 2008 {http://siliconmetal.net/}.*

(Continued)

*Primary Examiner* — Cynthia H Kelly
*Assistant Examiner* — Aaron J Greso
(74) *Attorney, Agent, or Firm* — Sheppard Mullin Richter & Hampton LLP

(57) ABSTRACT

A battery electrode material includes: 1) primary particles formed of an electrochemically active material; and 2) a secondary particle defining multiple, discrete internal volumes, wherein the primary particles are disposed within respective ones of the internal volumes.

19 Claims, 30 Drawing Sheets

(51) Int. Cl.
  *H01M 4/62* (2006.01)
  *H01M 10/052* (2010.01)
  *H01M 4/134* (2010.01)

(52) U.S. Cl.
  CPC ........... *H01M 4/625* (2013.01); *H01M 4/626* (2013.01); *H01M 10/052* (2013.01)

(56) References Cited

U.S. PATENT DOCUMENTS

| | | | |
|---|---|---|---|
| 2009/0246624 A1* | 10/2009 | Kojima | H01M 4/587 429/207 |
| 2010/0062338 A1 | 3/2010 | Golightly et al. | |
| 2011/0111294 A1* | 5/2011 | Lopez | H01M 4/134 429/217 |
| 2011/0136017 A1 | 6/2011 | Singh et al. | |
| 2011/0311873 A1* | 12/2011 | Schulz | C01B 31/00 429/231.8 |
| 2012/0064408 A1 | 3/2012 | Song et al. | |
| 2012/0088155 A1 | 4/2012 | Yushin et al. | |
| 2012/0100438 A1 | 4/2012 | Fasching et al. | |
| 2012/0244391 A1 | 9/2012 | Yushin et al. | |
| 2012/0244428 A1* | 9/2012 | Park | H01M 4/13 429/211 |
| 2012/0251886 A1 | 10/2012 | Yushin et al. | |
| 2012/0321959 A1* | 12/2012 | Yushin | H01M 4/587 429/225 |
| 2012/0328943 A1 | 12/2012 | Mah et al. | |
| 2013/0069601 A1 | 3/2013 | Coowar et al. | |
| 2013/0196158 A1 | 8/2013 | Yoshida et al. | |

FOREIGN PATENT DOCUMENTS

| | | | | |
|---|---|---|---|---|
| JP | 2008-277232 | * | 11/2008 | ......... H01M 4/1363 |
| WO | WO 2011/084817 | * | 7/2011 | ............. H01M 4/70 |

OTHER PUBLICATIONS

Nozaki et al. (Nozaki et al Journal of Thermal Science and Technology vol. 2 No. 2 pp. 192-199, 2007).*

JP 2008-277232 English machine translation and Espacenet Abstract Nov. 13, 2008.*

International Search Report and Written Opinion (ISA/KR) for International Application No. PCT/US2014/059149, dated Jan. 21, 2015.

Jung, D.S. et al. (2013) "Spray Drying Method for Large-Scale and High-Performance Silicon Negative Electrodes in Li-Ion Batteries," Nano Lett. 13:2092-2097.

Li, X. et al. (2012) "Hollow core-shell structured porous Si—C nanocomposites for Li-ion battery anodes," J. Mater. Chem. 22:11014-11017.

Liu, N. et al. (2012) "A Yolk-Shell Design for Stabilized and Scalable Li-Ion Battery Alloy Anodes," Nano Lett. 12(6):3315-3321.

Magasinski, A. et al. (2010) "High-performance lithium-ion anodes using a hierarchical bottom-up approach," Nature Mater. 9:353-358.

Seh, Z.W. et al. (2013) "Sulphur-TiO(2) yolk-shell nanoarchitecture with internal void space for long-cycle lithium-sulphur batteries," Nature Communications 4:1331, 1-5.

Wang, B. et al. (2013) "Contact-Engineered and Void-Involved Silicon/Carbon Nanohybrids as Lithium-Ion-Battery Anodes," Adv. Mater. 25:3560-3565.

Wu, H. et al. (2012) "Stable cycling of double-walled silicon nanotube battery anodes through solid electrolyte interphase control," Nature Nanotechn. 7:310-315.

Yin, Y-X. et al. (2011) "Electrospray Synthesis of Silicon/Carbon Nanoporous Microspheres as Improved Anode Materials for Lithium-Ion Batteries," J. Phys. Chem. C 115:14148-14154.

* cited by examiner

LARGE-VOLUME-CHANGE LITHIUM BATTERY ELECTRODES

CROSS REFERENCE TO RELATED APPLICATION

This application claims the benefit of U.S. Provisional Application No. 61/887,011, filed on Oct. 4, 2013, the disclosure of which is incorporated herein by reference in its entirety.

STATEMENT REGARDING FEDERALLY SPONSORED RESEARCH OR DEVELOPMENT

This invention was made with Government support under contract no. DE-AC02-05CH11231 awarded by the Department of Energy. The Government has certain rights in the invention.

FIELD OF THE INVENTION

The invention generally relates to lithium battery electrodes and, more particularly, to hierarchical structure design for lithium battery electrodes.

BACKGROUND

Particle fracture and loss of electrical contact contribute to the capacity fading of silicon (Si)-based anodes. Decreasing the feature size to the nanoscale allows the material to withstand the large (de)lithiation strains with little or no fracture. However, the cycle life of nano-sized Si can still be limited due to the unstable solid-electrolyte interphase (SEI) on its surface. At the working potential of anodes (e.g., <0.5 V versus Li/Li$^+$), an organic electrolyte decomposes and forms a thin SEI layer. When the Si expands and contracts, the SEI layer deforms and breaks. The resulting formation of new SEI on the freshly exposed Si surfaces causes poor Coulombic efficiency (CE) of the cell, and the accumulated SEI eventually blocks the Li$^+$ transport. Due to this mechanism, even if most of the Si active material remains electrically connected, the capacity decays with the thickening of the SEI.

Although nanostructuring has been successful in extending the cycle life of Si, nanostructured electrodes introduced three additional fundamental challenges: higher surface area, low tap density, and generally poor electrical properties due to more electrical contact interfaces between particles. The high surface area increases side-reactions with the electrolyte and lowers the first cycle CE and later cycle CE. The low tap density leads to low volumetric energy density and a thick electrode at high mass loading, which makes it difficult to maintain electrical and ionic pathways during cycling. Finally, the electrical contact between nanoparticles is readily altered or diminished by volume changes during cycling, severely decreasing the cycle life of the electrode. It would be desirable to attain stable cycling (e.g., 100 cycles) with areal capacity at or higher than 3 mAh cm$^{-2}$. For practical applications, moreover, the fabrication methods utilized should be scalable and low-cost.

It is against this background that a need arose to develop the embodiments described herein.

SUMMARY

Advances in battery technology have become increasingly important to sustain an electrified society. Si anodes, with about ten times the theoretical capacity of state-of-the-art carbonaceous anodes, are promising for application not only in traditional Li-ion batteries, but also in next-generation Li—O$_2$ and Li—S batteries to replace dendrite-forming Li metal anodes. The main challenges associated with Si anodes are: structural degradation and unstable SEI caused by the large volume change (about 300%) during cycling, and increased side-reactions with the electrolyte and low volumetric energy density when the material size is reduced to the nanoscale. In some embodiments, this disclosure describes a pomegranate-inspired hierarchical structure with electrically interconnected primary Si nanoparticles and individually engineered nanoscale empty space encapsulated by a carbon layer to form micrometer-sized secondary particles, which simultaneously overcome the challenges noted above. Internally accommodated volume expansion and spatially confined SEI formation results in superior cycle life (e.g., 1000 cycles with at least about 97% capacity retention), while the secondary structure lowers the electrode/electrolyte contact area for improvement of CE and increases tap density. Furthermore, unprecedented stable cycling (e.g., 100 cycles with at least about 94% capacity retention) with high areal capacity (e.g., at least about 3.7 mAh cm$^{-2}$) is demonstrated, similar to the areal capacity of commercial Li-ion batteries. The design principles developed in this disclosure can be widely applied to other high-capacity Li battery electrodes such as germanium (Ge), tin (Sn), tin oxide (SnO$_x$), silicon oxide (SiO), phosphorus (P) and sulfur (S).

In other embodiments, an electroless plating method is developed for substantially uniform copper coating on Si pomegranate structures. The presence of a coated copper layer significantly enhances inter-particle electrical conductivity in an electrode. As a result, the copper-coated structure exhibits excellent electrochemical performance, including a stable cycling performance at a high mass loading (e.g., an areal capacity of at least about 3.13 mAh cm$^{-2}$ at a mass loading of at least about 4.10 mg cm$^{-2}$ after 100 cycles), and excellent rate capability (e.g., at least about 861 mAh g$^{-1}$ at 1C rate and at least about 467 mAh g$^{-1}$ at 4C rate).

In some embodiments, a battery electrode material includes: 1) primary particles formed of an electrochemically active material; and 2) a secondary particle defining multiple, discrete internal volumes, wherein the primary particles are disposed within respective ones of the internal volumes. In some embodiments, the battery electrode material also includes a coating of a conductive material covering the secondary particle, such as a metal coating.

In other embodiments, this disclosure describes the design of a non-filling carbon-coated porous silicon microparticle (nC-pSiMP). In this structure, a porous silicon microparticle (pSiMP) is composed of multiple interconnected primary silicon nanoparticles, with an outer surface of the pSiMP selectively coated with carbon, and leaving interior pore structures uncoated. The non-filling carbon coating or layer reduces an electrode-electrolyte contact area and retains internal pore space for Si expansion. Most SEI formation is located on the outer carbon layer. As a result, the composite structure can achieve excellent cycling stability with high reversible specific capacity (e.g., at least about 1500 mAh g$^{-1}$ over 1000 cycles) at a rate of C/4. In addition, pSiMPs are prepared by thermal disproportionation of silicon monoxide, resulting in densely packed Si nanoparticles that leave sufficient void space for Si expansion during full lithiation. This allows for a high volumetric capacity (e.g., at least about 1000 mAh cm$^{-3}$) even when an areal density is over about 2.0 mg cm$^{-2}$. Moreover, the production of nC-pSiMP is highly scalable with the use of a commercially available Si source and a synthesis method described herein.

In some embodiments, a battery electrode material includes: 1) a porous particle formed of an electrochemically active material; and 2) a shell formed of a conductive material and encapsulating the porous particle. In some embodiments, the porous particle includes interconnected nanoparticles formed of the electrochemically active material.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Hierarchical Structure Design for Silicon Anodes

Figure 1:
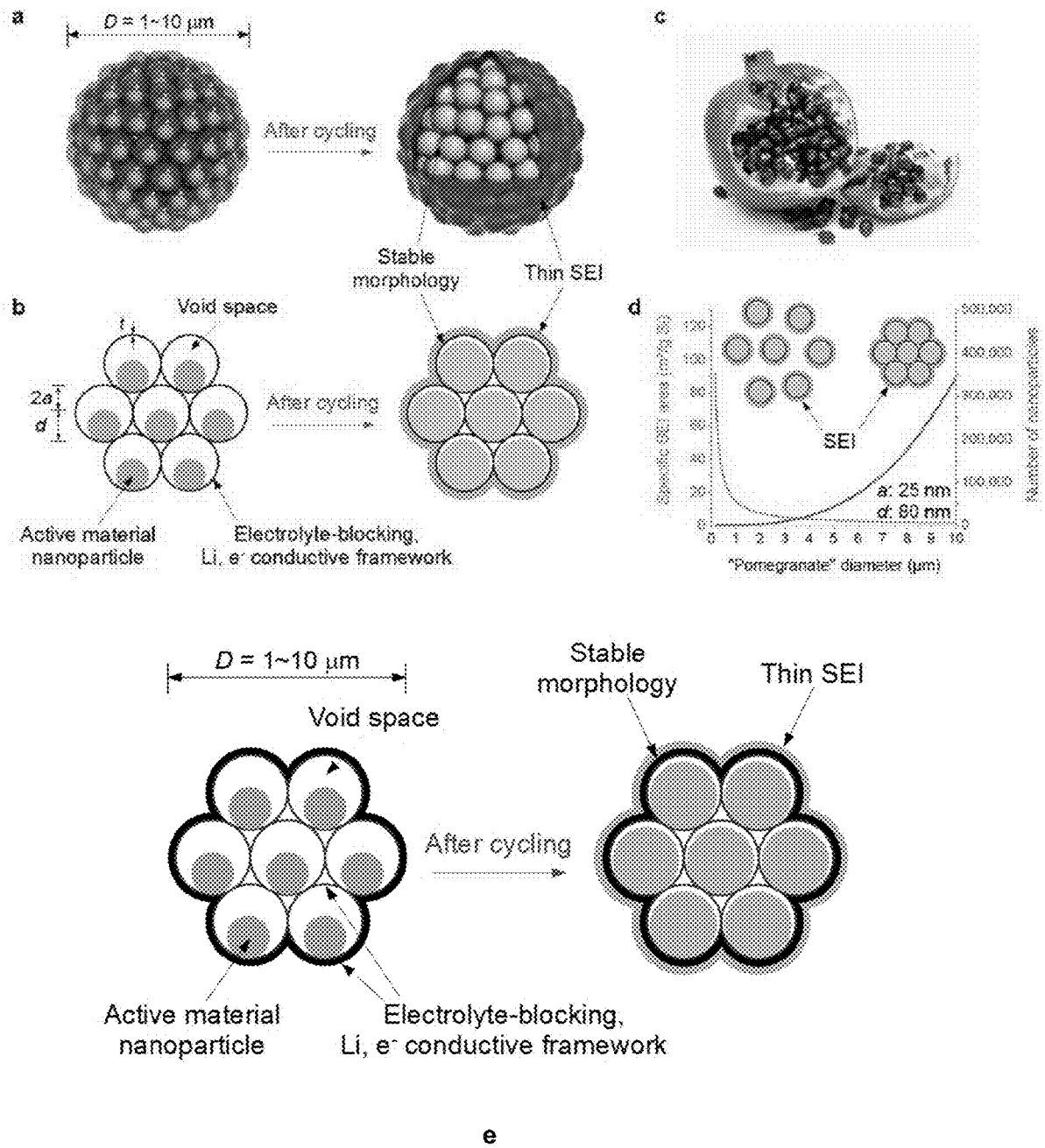
FIG. 1: Schematic of the pomegranate-like design. a,b, Three dimensional view (a) and simplified two-dimensional cross-section view (b) of one pomegranate microparticle before and after electrochemical cycling (in the lithiated state). The nanoscale size of the active material primary particles prevents fracture upon (de)lithiation, while the micrometer size of the secondary particles increase the tap density and decrease the surface area in contact with the electrolyte. The self-supporting conductive carbon framework blocks the electrolyte and prevents SEI formation inside the secondary particle, while facilitating Li transport throughout the whole particle. The well-defined void space around each primary particle allows it to expand without deforming the overall morphology, thus the SEI outside the secondary particle is not ruptured during cycling and remains thin. c, A picture of a pomegranate fruit. d, Calculated surface area in contact with electrolyte (i.e., the specific SEI area), and the number of primary nanoparticles in one pomegranate particle versus its diameter. e, Another two-dimensional cross-section view of one pomegranate microparticle before and after electrochemical cycling (in the lithiated state). The porous carbon framework conformally covers the whole secondary particle surface, so that most of the SEI selectively forms on the outside of the secondary particle.
Figure 5:
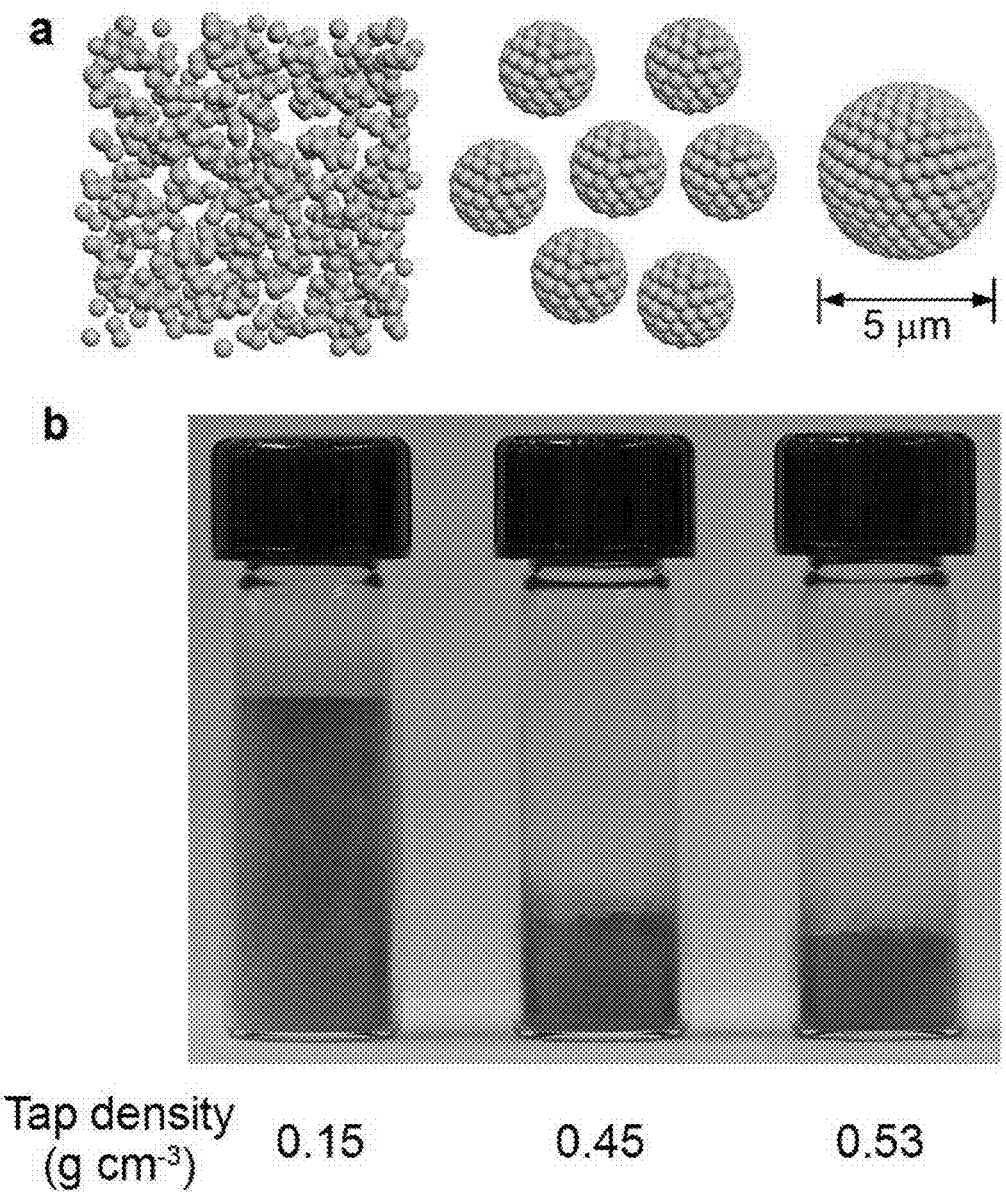
FIG. 5: Schematics (a) and pictures (b) of free Si nanoparticles (about 80 nm), small secondary particles (about 1-2 µm), and large secondary particles (about 5 µm) of the same Si nanoparticles. Each vial contains about 0.4 g of tightly packed powders. The secondary particles were made with similar microemulsion methods described in the Methods section. The size of the secondary particles was tuned by changing the Si concentration in the water dispersion.

By way of analogy to the structure of a pomegranate fruit, some embodiments of this disclosure implement the design of a secondary structure for Si anodes (FIGS. 1a-c and e). SiNPs are embedded within a spherical or spheroidal, micron-sized porous carbon framework (or other encapsulating structure). The porous carbon framework of nanoscale thickness connects the SiNPs, and also conformally covers the whole secondary particle surface (as more clearly shown in FIG. 1e), so that most of the SEI selectively forms on the outside of the secondary particle, instead of on individual nanoparticles. Well-defined void space is engineered around each nanoparticle, allowing the Si to expand with little or no changes to the secondary particle morphology or breaking the SEI layer. Such a design has multiple advantageous features, including (i) the nano-sized primary Si particle size mitigates against fracture; (ii) the micron-sized secondary structure makes it easier to maintain electrical contact; (iii) the well-defined internal void space allows the SiNPs to expand without altering the secondary particle morphology; (iv) the carbon framework functions as an electrical highway and a mechanical backbone so that most or all SiNPs are electrochemically active; (v) carbon also substantially completely wraps the secondary particle surface to confine most of SEI formation to the outer surface, which confines the amount of SEI, and also retains the internal void space for Si expansion; and (vi) the dilemma of high surface area and low tap density introduced when using nano-sized primary feature is addressed. With this design, the specific SEI area (the surface area in contact with electrolyte divided by the mass of Si) decreases from about 90 m$^2$ g$^{-1}$ for single yolk-shell particles to about 15 m$^2$ g$^{-1}$ for 1 μm secondary particles and to about 1.5 m$^2$ g$^{-1}$ for 10 μm particles (FIG. 1d). More generally, the specific SEI area for secondary particles can be no greater than about 50 m$^2$ g$^{-1}$, no greater than about 45 m$^2$ g$^{-1}$, no greater than about 40 m$^2$ g$^{-1}$, no greater than about 35 m$^2$ g$^{-1}$, no greater than about 30 m$^2$ g$^{-1}$, no greater than about 25 m$^2$ g$^{-1}$, no greater than about 20 m$^2$ g$^{-1}$, no greater than about 15 m$^2$ g$^{-1}$, no greater than about 10 m$^2$ g$^{-1}$, or no greater than about 5 m$^2$ g$^{-1}$, and down to about 2 m$^2$ g$^{-1}$, down to about 1 m$^2$ g$^{-1}$, or less. At the same time, because of the space-efficient packing inside the secondary particles, their tap density is significantly higher than primary nano-sized particles packed randomly. In a demonstration shown in FIG. 5, Si nanoparticles have a tap density of about 0.15 g cm$^{-2}$, while micron-sized clusters have a tap density of about 0.53 g cm$^{-2}$, which is an about 250% increase. This tap density is within the desirable range for electrodes since the volume expansion of Si is by up to about 300%. More generally, the tap density of micron-sized secondary particles encapsulating Si nanoparticles can be at least about 0.25 g cm$^{-3}$, at least about 0.3 g cm$^{-3}$, at least about 0.35 g cm$^{-3}$, at least about 0.4 g cm$^{-3}$, at least about 0.45 g cm$^{-3}$, at least about 0.47 g cm$^{-3}$, at least about 0.49 g cm$^{-3}$, or at least about 0.5 g cm$^{-3}$, and up to about 0.55 g cm$^{-3}$, up to about 0.6 g cm$^{-3}$, up to about 0.8 g cm$^{-3}$, up to about 1.0 g cm$^{-3}$, or more. The pre-designed empty space can accommodate this change locally within each micro-particle without expansion at the whole electrode level.

Figure 2:
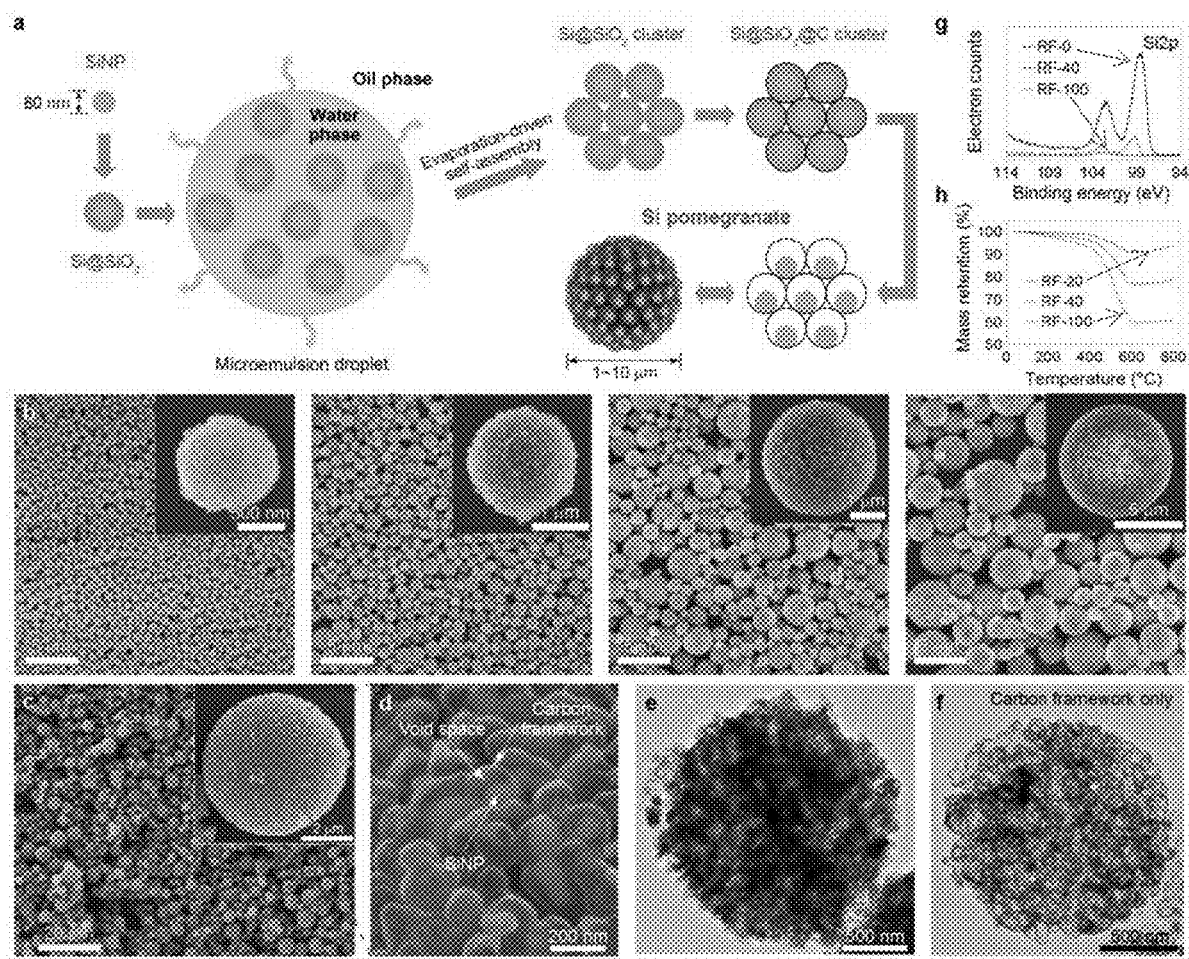
FIG. 2: Fabrication and characterization of Si pomegranates. a, Schematic of the fabrication process of Si pomegranates. b, A series of clusters of bare Si nanoparticles (SiNPs) with different diameters assembled by microemulsion. c, Scanning electron microscopy (SEM) images of Si pomegranates showing the micron-size and spherical morphology. d, A magnified SEM image showing the local structure of Si nanoparticles and conductive carbon framework with well-defined void space in between. e, A transmission electron microscopy (TEM) image of one Si pomegranate particle. f, A TEM image of the carbon framework after etching away SiNPs using NaOH. g,h, High-resolution X-ray photoelectron spectroscopy (XPS) spectra of Si 2p peaks (f) and thermogravimetric (TGA) profiles (g) of Si pomegranates with different thicknesses of the carbon framework. X in "RF-X" denotes X mg of resorcinol used for each 100 mg of Si@$SiO_2$ in the RF coating operation (see Methods section in Example). RF-0 denotes clusters of SiNPs without carbon.
Figure 6:
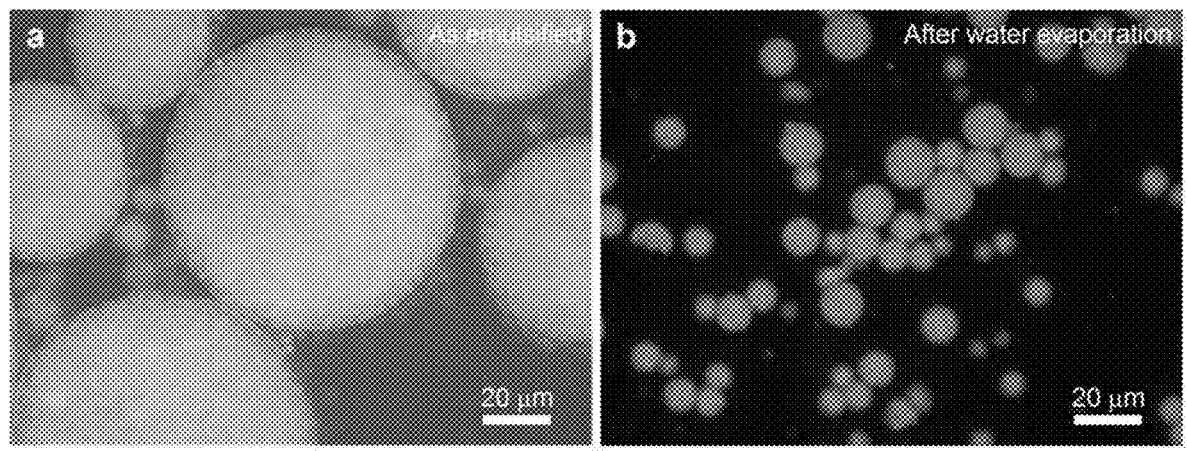
FIG. 6: Optical micrographs of (a) Si@$SiO_2$ nanoparticles in water droplets in 1-octadecene, and (b) Si@$SiO_2$ clusters after water evaporation. The yellow color is due to the nano-sized Si primary particles. Microemulsion is used to produce spherical secondary particles. The surface hydrophilicity of Si@$SiO_2$ nanoparticles keeps it inside the water droplet, so that solid Si@$SiO_2$ clusters were obtained after water evaporation. If the nanoparticles stayed at the water-oil interface, hollow microspheres would have been obtained instead.
Figure 7:
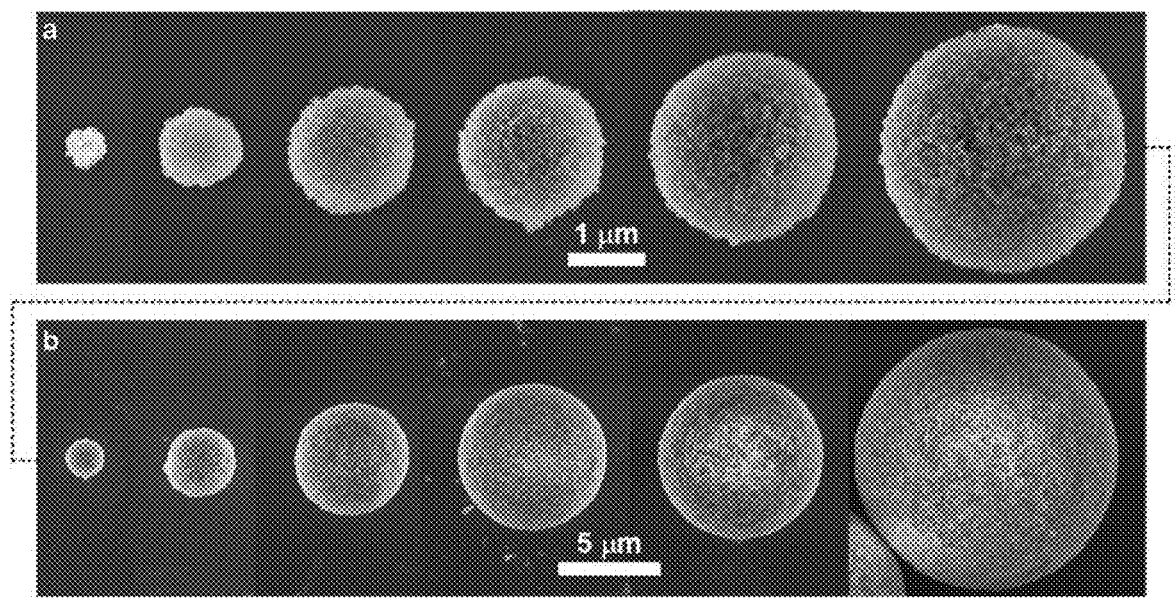
FIG. 7: Typical SEM images of microemulsion-derived clusters of SiNPs. The diameters of the clusters range from about 500 nm to about 10 µm. All the clusters show highly spherical morphology.
Figure 8:
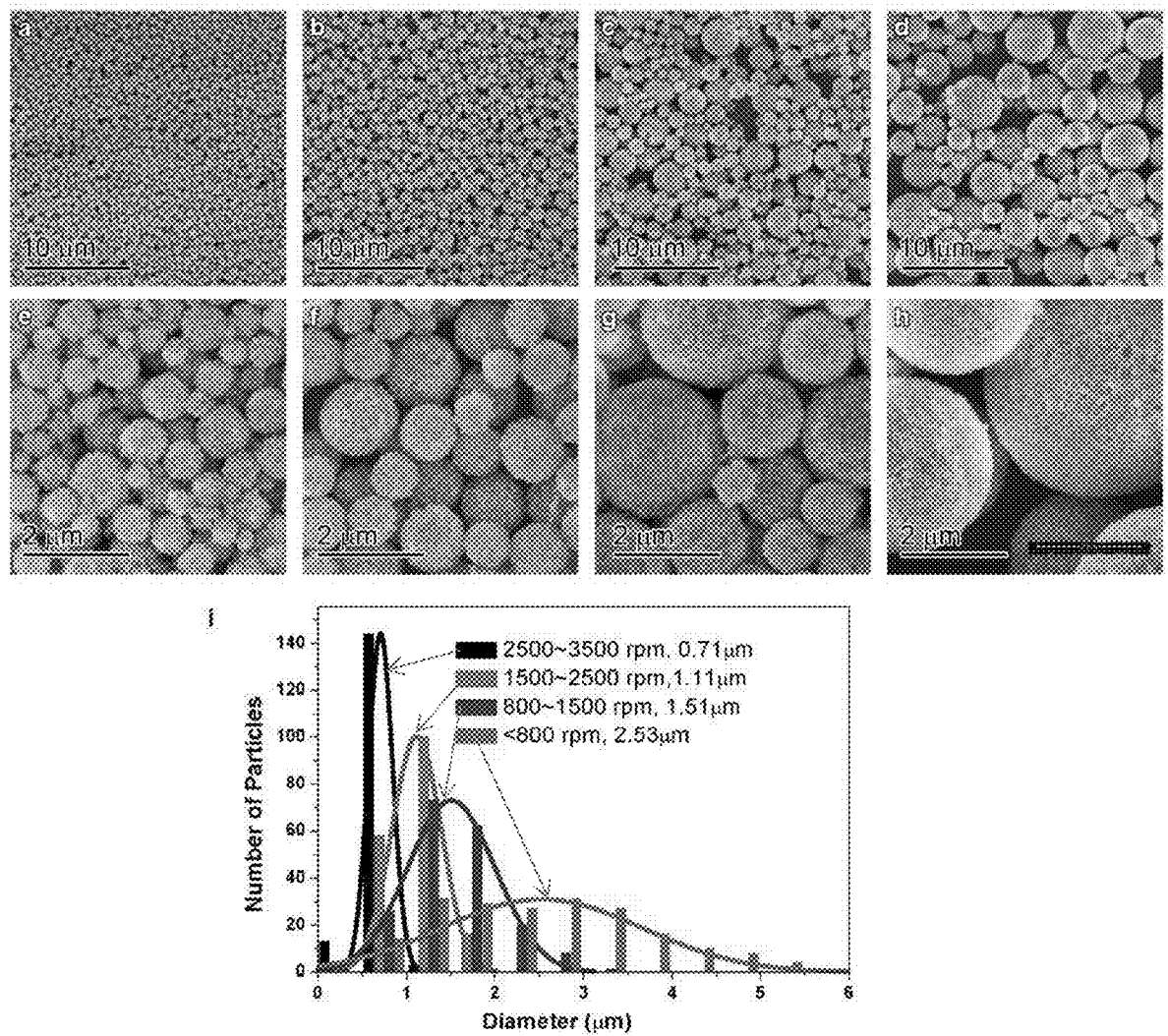
FIG. 8: (a-h) Centrifugation-separated clusters of SiNPs, with average diameters of about 0.71 µm (a,e), about 1.11 µm (b,f), about 1.51 µm (c,g), and about 2.53 µm (d,h). The highly spherical morphology remains after centrifugation. (i) Statistical analysis of the cluster diameter.

In some embodiments, a bottom-up and scalable approach is used to synthesize Si pomegranate microbeads (FIG. 2a). SiNPs (about 80 nm in diameter) were first coated with a SiO$_2$ sacrificial layer, which will be removed in the operation to create void space. An aqueous dispersion of Si@SiO$_2$ nanoparticles forms micro-droplets in an oil phase with the help of an emulsion stabilizer. After water evaporation, Si@SiO$_2$ clusters were obtained (FIG. 6). Subsequent resorcinol-formaldehyde (RF) polymer coating, carbonization, and hydrofluoric acid etching produces Si pomegranate microbeads. The microemulsion approach is robust in producing highly spherical secondary particles ranging from about 500 nm to about 10 μm in diameter (FIG. 7); and different sizes can be separated with ease by centrifugation (FIG. 2b and FIG. 8). The fabrication is scalable, and does not require any complex equipment such as chemical vapor deposition.

The pomegranate design of this disclosure is different from other designs for SiNP-carbon composite secondary particles. First, the carbon component is a framework and conducting pathway in the secondary particle, but it also substantially or largely completely covers the secondary particle surface and blocks the electrolyte (such as in the form of an outer shell or "skin" as shown in FIG. 1e), and therefore SEI forms mostly outside the secondary particle. Second, the void spaces inside the secondary particle are well-defined and evenly distributed around each nanoparticle, which effectively accommodate the volume expansion of Si without rupturing the carbon shell or deforming the secondary particle. The initial well-defined void spaces do not decrease the volumetric capacity because they can be designed to be mostly occupied in the lithiated state.

In some embodiments, secondary particles have a spherical or spheroidal shape, although other shapes are contemplated. The secondary particles can have an outer lateral dimension (e.g., an outer diameter, an outer lateral dimension along a major axis, an averaged outer lateral dimension along a major axis and a minor axis, or another characteristic outer lateral dimension) in the range of about 200 nm to about 200 µm, such as about 300 nm to about 150 µm, about 400 nm to about 100 µm, about 500 nm to about 50 µm, about 500 nm to about 40 µm, about 500 nm to about 30 µm, about 500 nm to about 20 µm, about 500 nm to about 10 µm, or about 1 µm to about 10 µm, and an aspect ratio (e.g., specified as a ratio of outer lateral dimensions along a major axis and a minor axis) that is less than about 10, such as no greater than about 5, no greater than about 4, no greater than about 3.5, no greater than about 3, no greater than about 2.5, no greater than about 2, no greater than about 1.5, or about 1. In some embodiments, the secondary particles are largely or substantially monodisperse, such that at least about 50%, at least about 60%, at least about 70%, at least about 80%, at least about 90%, or at least about 95% of the secondary particles are within one or more of the ranges of dimensions specified above. The carbon coating or walls of the secondary particles can have a thickness in the range of about 1 nm to about 100 nm, such as about 5 nm to about 90 nm, about 10 nm to about 80 nm, about 10 nm to about 70 nm, about 10 nm to about 60 nm, about 10 nm to about 50 nm, about 10 nm to about 40 nm, or about 10 nm to about 30 nm. The carbon coating can be thicker at the outer surfaces of the secondary particles than in the interior of the secondary particles. The secondary particles can be formed of other types of conductive materials in place of, or in combination with, carbon, such as conductive polymers, metals (e.g., copper, nickel, and so forth), titanium oxide (doped or undoped), and other types of metal oxides, metal nitrides (e.g., titanium nitride), and metal sulfides. The secondary particles can be electrically conductive, ionically conductive (e.g., with respect to Li ions or other types of ions), or both.

In some embodiments, each secondary particle defines multiple, discrete internal volumes, with the carbon coating or walls of the secondary particle bounding the internal volumes to define substantially or largely closed volumes. Si nanoparticles (or other primary particles of an electrochemically active material) are disposed within respective internal volumes. In some embodiments, at least one Si nanoparticle (or other primary particle) is disposed within each internal volume, and, in other embodiments, more than one Si nanoparticle (or other primary particle) is disposed within each internal volume. Each secondary particle can define a number of internal volumes that is at least 2, at least 10, at least 50, at least 100, at least 500, at least 1000, at least 5000, at least $10^4$, at least $5\times10^4$, at least $10^5$, at least $2\times10^5$, or at least $3\times10^5$, and up to $4\times10^5$, up to $5\times10^5$, or more, and can encapsulate a number of Si nanoparticles (or other primary particles) that is at least 2, at least 10, at least 50, at least 100, at least 500, at least 1000, at least 5000, at least $10^4$, at least $5\times10^4$, at least $10^5$, at least $2\times10^5$, or at least $3\times10^5$, and up to $4\times10^5$, up to $5\times10^5$, or more.

In some embodiments, Si nanoparticles (or other primary particles) have a spherical or spheroidal shape, although other shapes are contemplated. Primary particles can have an outer lateral dimension (e.g., an outer diameter, an outer lateral dimension along a major axis, an averaged outer lateral dimension along a major axis and a minor axis, or another characteristic outer lateral dimension) in the range of about 1 nm to about 2000 nm, such as about 5 nm to about 1500 nm, about 5 nm to about 1000 nm, about 10 nm to about 1000 nm, about 20 nm to about 500 nm, about 1 nm to about 500 nm, about 30 nm to about 300 nm, about 40 nm to about 200 nm, about 1 nm to about 200 nm, about 50 nm to about 100 nm, about 1 nm to about 100 nm, or about 60 nm to about 100 nm, and an aspect ratio (e.g., specified as a ratio of outer lateral dimensions along a major axis and a minor axis) that is less than about 10, such as no greater than about 5, no greater than about 4, no greater than about 3.5, no greater than about 3, no greater than about 2.5, no greater than about 2, no greater than about 1.5, or about 1. A primary particle can be largely or substantially solid, or can have a void or an empty space disposed within an interior of, and at least partially surrounded by, the primary particle. Other types of nanostructures can be used in place of, or in combination with, spherical or spheroidal primary particles, such as elongated nanostructures having an aspect ratio that is at least about 10, whether solid or hollow. Primary particles can be formed of other types of electrochemically active materials in place of, or in combination with, silicon, such as other anode materials that alloy with lithium (e.g., tin, germanium, magnesium, aluminum, tin oxide, silicon monoxide, phosphorus, and so forth) and sulfur-based cathode materials.

As noted above for some embodiments, each secondary particle defines multiple, discrete internal volumes, and Si nanoparticles (or other primary particles of an electrochemically active material) are disposed within respective internal volumes. Each primary particle is disposed within a respective internal volume and occupies less than 100% of the internal volume, thereby leaving a void space to allow for expansion of the Si material (or other electrochemically active material). In some embodiments, such as for the case of a Si material in its substantially de-lithiated state (or another reference cycling state), a ratio of the volume of the void space relative to the volume of the Si material inside the internal volume is at least about 1:2, at least about 1:1, at least about 2:1, at least about 2.5:1, at least about 2.7:1, at least about 2.9:1, at least about 3:1, or at least about 3.1:1, and up to about 3.3:1, up to about 3.5:1, up to about 4:1, or more. In some embodiments, such as for the case of the Si material in its substantially de-lithiated state, a ratio of the volume of the void space relative to the internal volume is at least about 1:3, at least about 1:2, at least about 2:3, at least about 2.5:3.5, at least about 2.7:3.7, at least about 2.9:3.9, at least about 3:4, or at least about 3.1:4.1, and up to about 3.3:4.3, up to about 3.5:4.5, up to about 4:5, or more, with a remainder of the internal volume taken up by the Si material. In some embodiments, such as for the case of the Si material in its substantially de-lithiated state, a ratio of the volume of the Si material relative to the internal volume can be up to about 2:3, up to about 1:2, up to about 1:3, up to about 1:3.5, up to about 1:3.7, up to about 1:3.9, up to about 1:4, or up to about 1:4.1, and down to about 1:4.3, down to about 1:4.5, down to about 1:5, or less. In some embodiments, a weight ratio of the Si material (or other electrochemically active material) relative to a combined weight of the Si material and secondary particles encapsulating the Si material is in the range of about 10% to about 99%, such as from about 20% to about 98%, from about 30% to about 95%, from about 40% to about 95%, from about 50% to about 95%, from about 55% to about 95%, from about 60% to about 95%, or from about 65% to about 95%.

Figure 9:
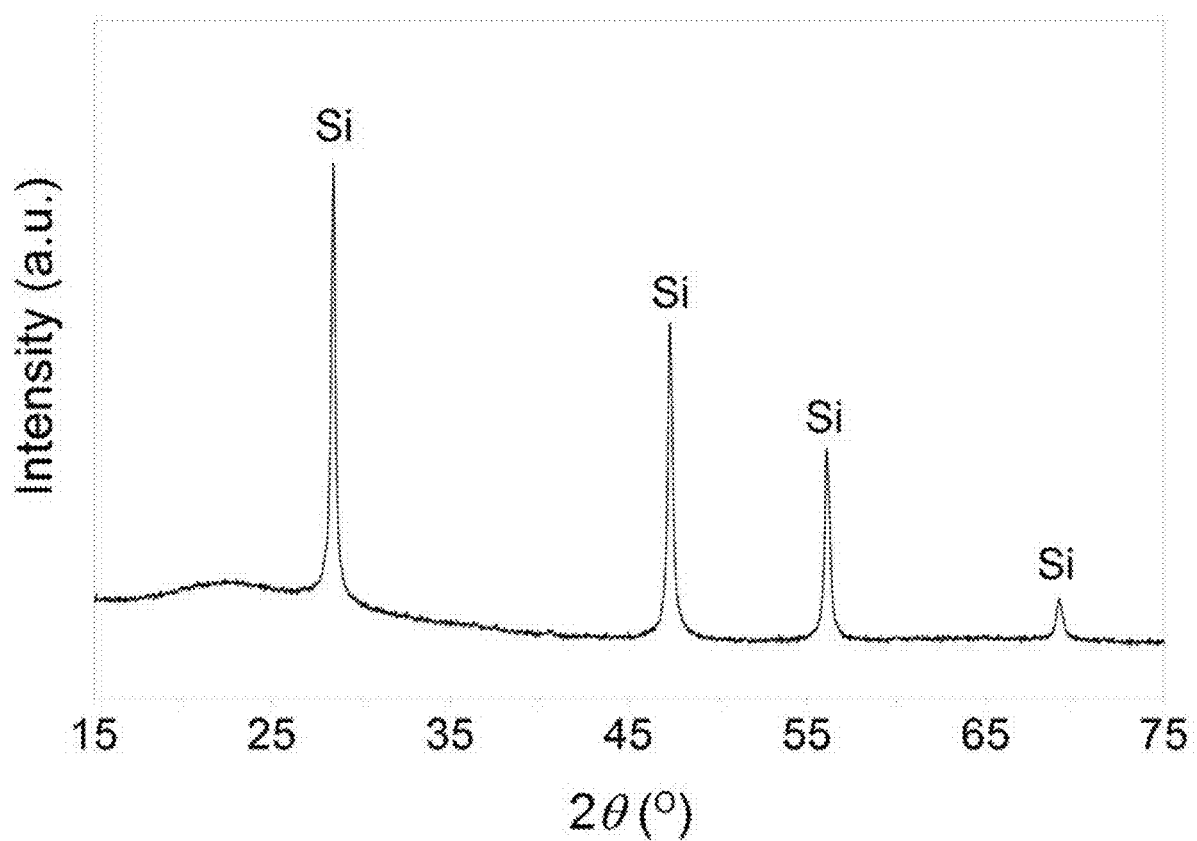
FIG. 9: X-ray diffraction pattern of the Si pomegranates. All the peaks are attributed to crystalline Si. The broad peak between about 20 and about 25° can be attributed to the amorphous carbon framework in the Si pomegranate structures.
Figure 10:
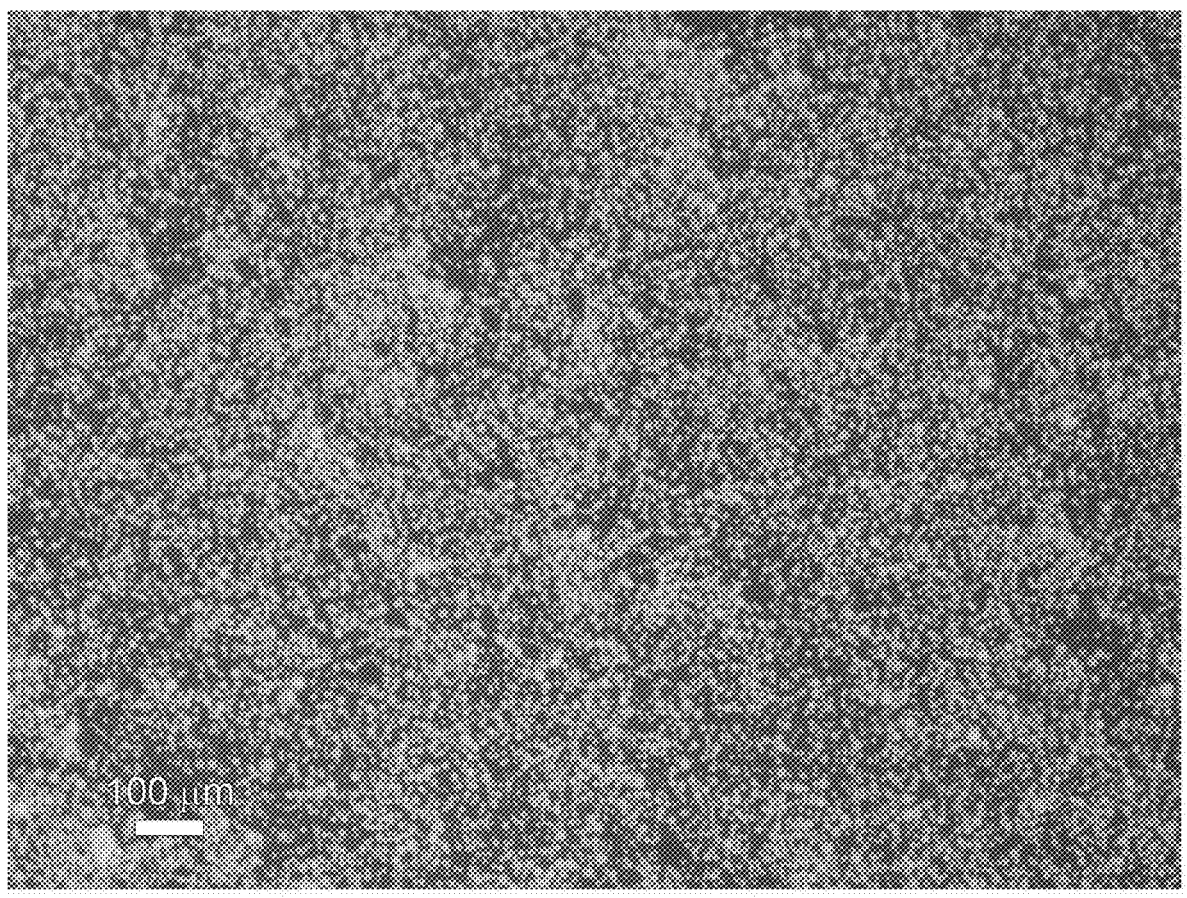
FIG. 10: Optical micrograph of monodisperse Si pomegranate microbeads in N-methylpyrrolidone. The conformal carbon coating makes the microbeads highly dispersible in N-methylpyrrolidone. The yellow color is characteristic for the nano-sized Si primary particles inside the microbeads.
Figure 11:
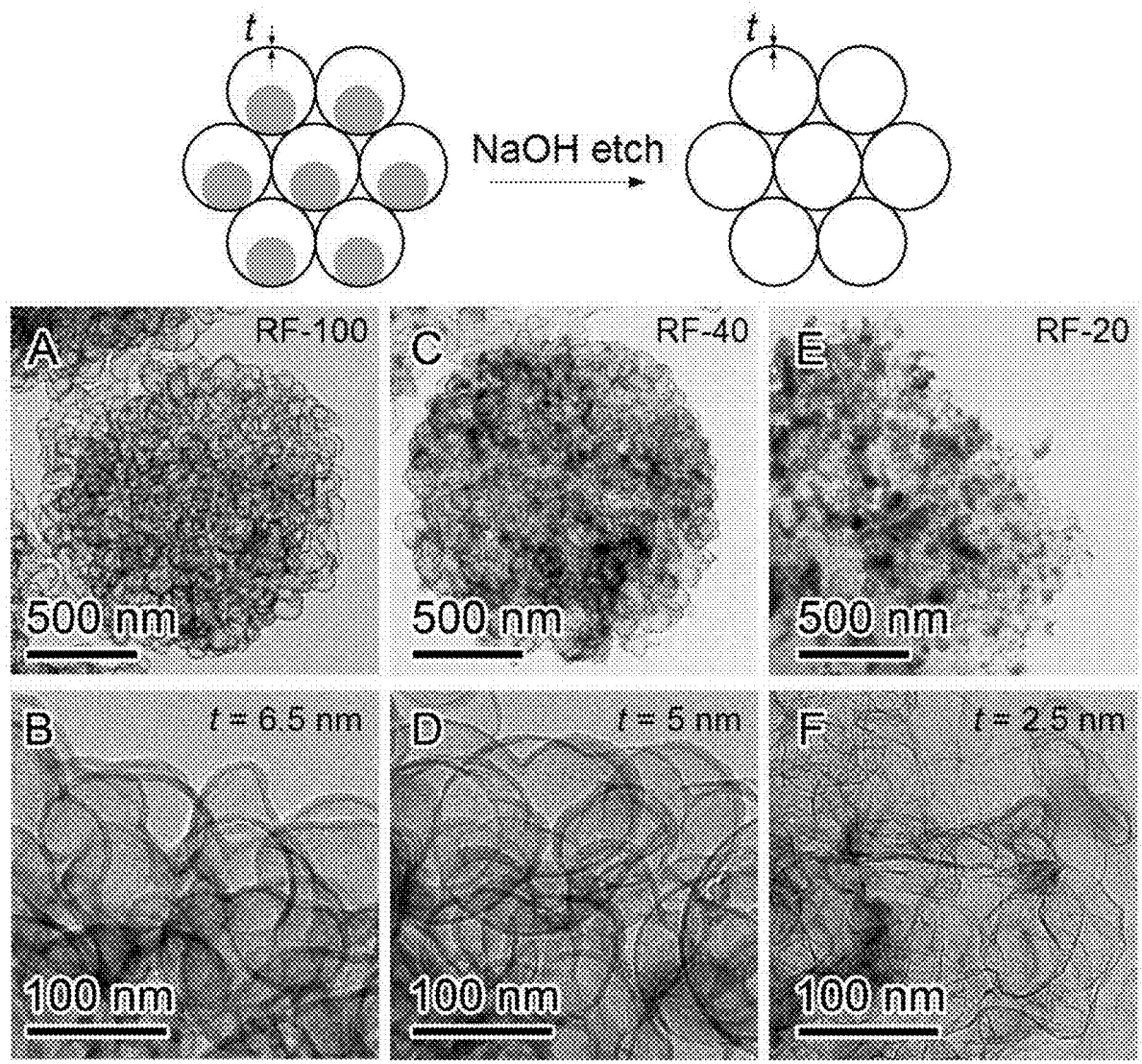
FIG. 11: TEM images of the carbon framework after etching Si with NaOH. (a,b) RF-100; (c,d) RF-40; (e,f) RF-20. At the top is the schematic showing the etching process. The thickness of the carbon layer is represented by t. The carbon forms a conformal coating at the surface and a continuous framework in the interior. When its thickness is less than about 2.5 nm in some embodiments, the carbon framework becomes less continuous and may not be sturdy enough to support the secondary particles.
Figure 12:
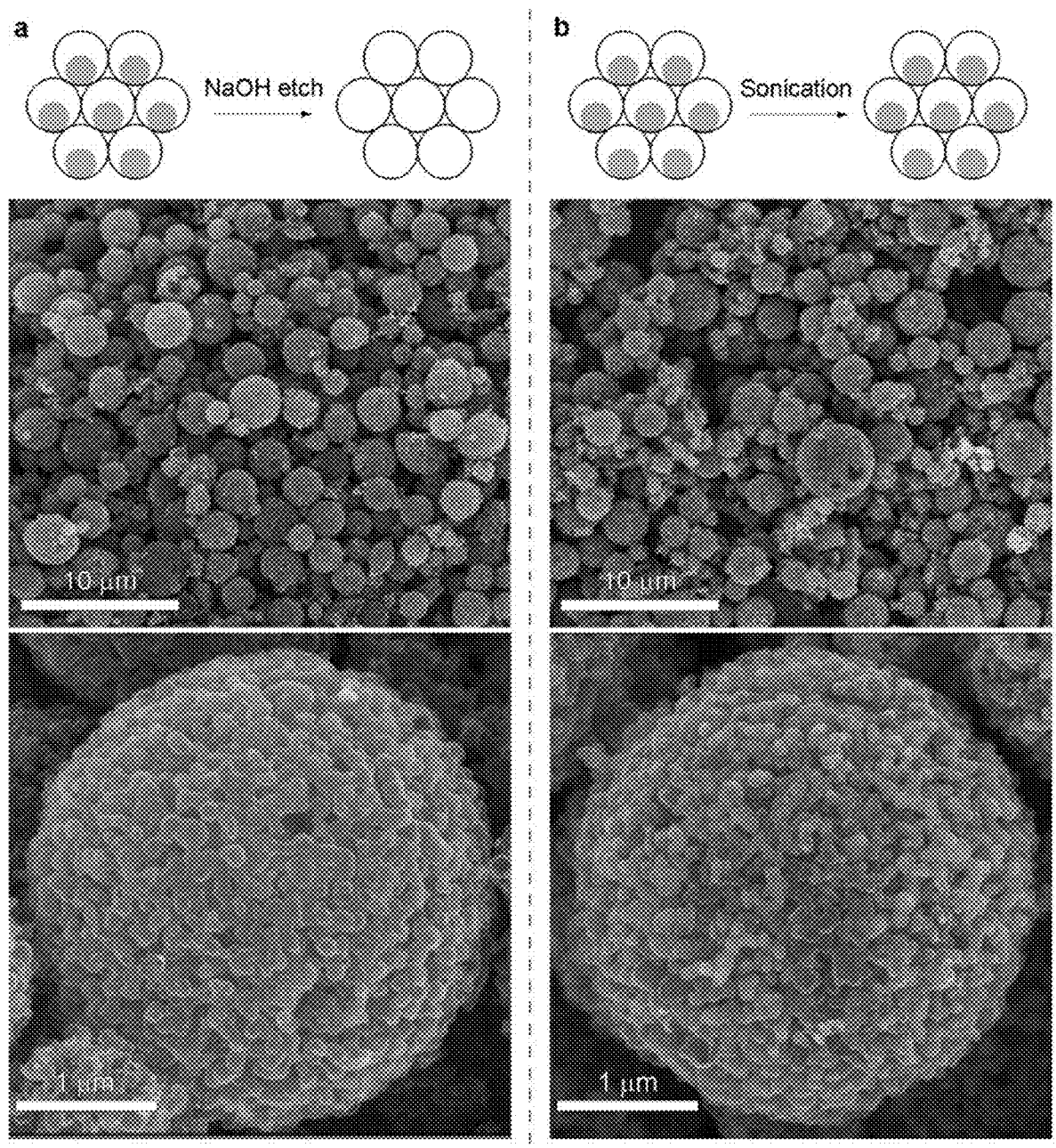
FIG. 12: Schematic and SEM images of the Si pomegranates after (a) NaOH etching or (b) 5 min intense sonication in ethanol. In the magnified SEM image at the bottom, it can be seen that the carbon shell is intact and the same as before etching or sonication. The robust carbon framework stabilizes the secondary particle morphology while the primary nanoparticles inside go through drastic volume changes.
Figure 13:
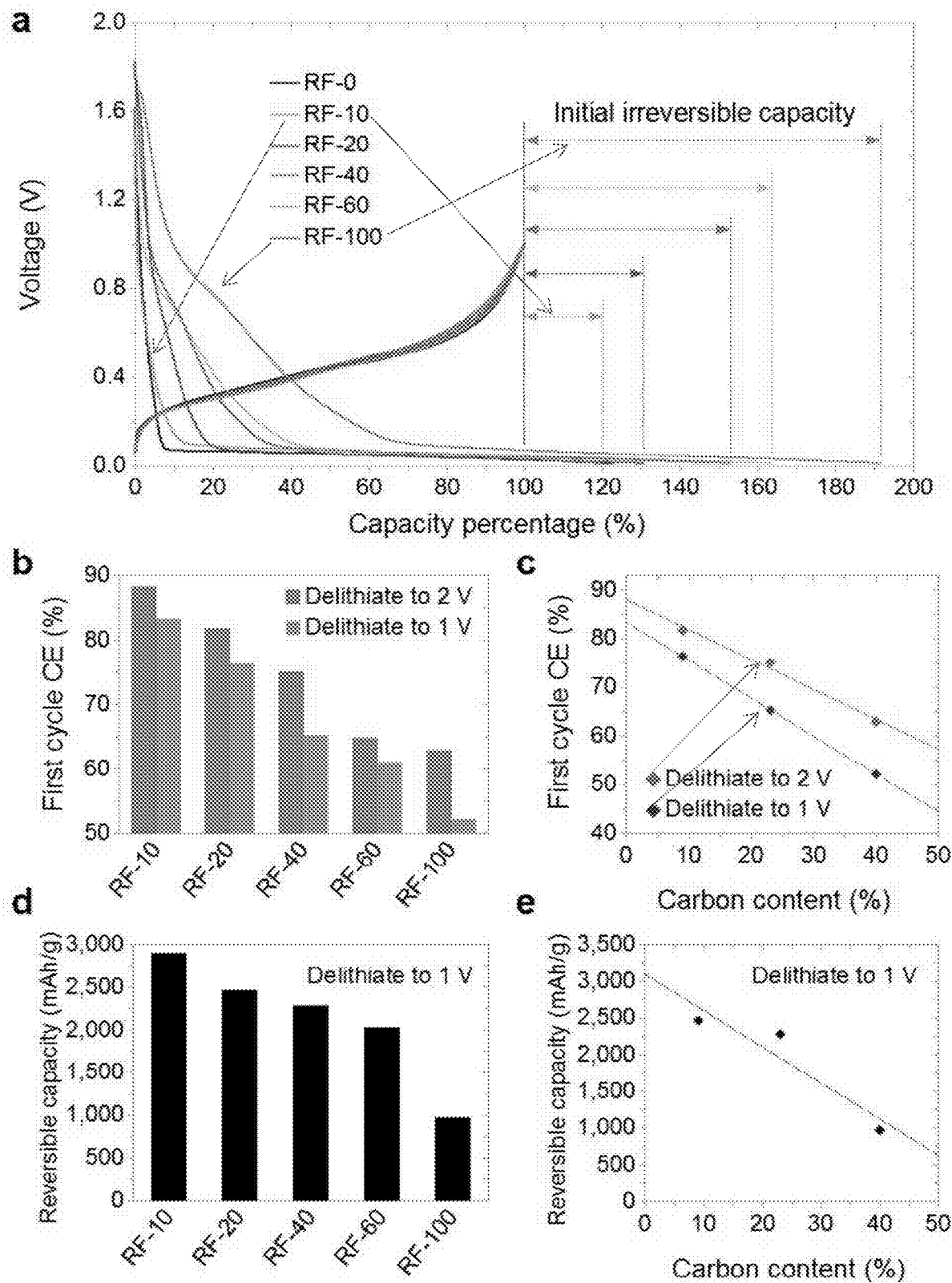
FIG. 13: (a) First cycle voltage profiles of Si pomegranate with different carbon coating thicknesses. For ease of comparison, all the curves are normalized by delithiation capacity. The delithiation profiles almost overlap for all the curves. And the delithiation capacities are close to the lithiation capacities at the plateau below about 0.1 V, corresponding to the reversible capacity contributed by Si. Therefore, the majority of the irreversible capacity is from the initial sloping part of the lithiation profile, corresponding to the lithiation of amorphous carbon and formation of SEI. (b) First cycle CE comparison. Delithiation to a higher potential increases the CE. (c) Relationship between first cycle CE and carbon content in the Si pomegranate. The dotted lines are merely for guidance of the eye. The carbon content was determined by TGA as shown in FIG. 2h. (d,e) First cycle delithiation capacity comparison and its relationship with carbon content. All the capacities are with respect to the total mass of Si and C in the pomegranate structure. (f) First cycle voltage profiles of Si pomegranate with different carbon coating thicknesses compared with individual yolk-shell structures. (g) First cycle delithiation capacity of Si pomegranate with different carbon coating thicknesses compared with individual yolk-shell structures.
Figure 13:
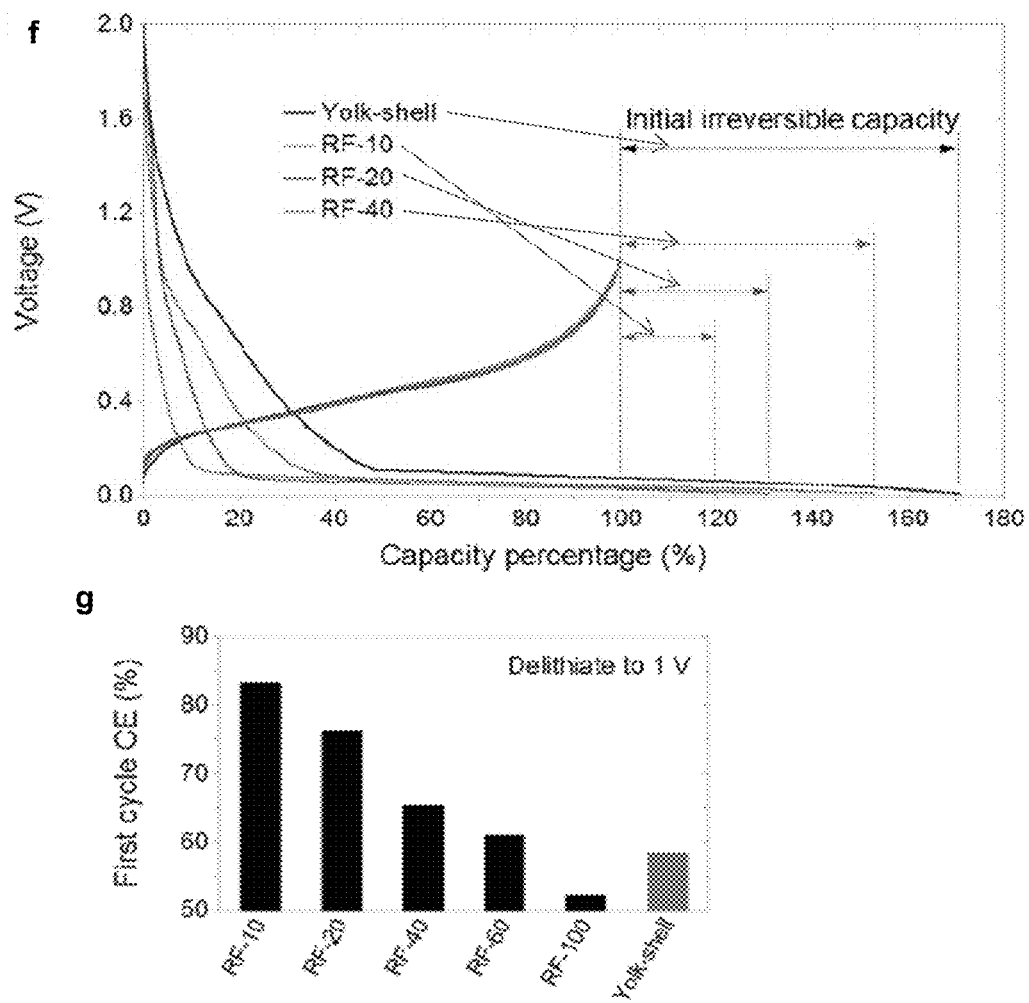

The pomegranate design was successfully fabricated as evidenced by extensive characterization. X-ray diffraction of the product confirms the composite of crystalline Si and amorphous carbon (FIG. 9). SEM images show that they have a spherical morphology with diameters of a few micrometers (FIG. 2c). Monodisperse Si pomegranate microbeads are visible with an optical microscope (FIG. 10). A magnified SEM image (FIG. 2d) shows that SiNPs were conformally coated by the carbon framework with well-defined void spaces in between the Si and C, which accommodates the volume expansion of Si. As evidenced by the TEM image (FIG. 2e), the interior of the microbead is not empty. The carbon framework, though a few nanometers thick (FIG. 11), firmly supports the whole microbead. Indeed, even after intense sonication or etching away of the SiNPs with NaOH, the carbon framework remained intact (FIG. 2f, FIG. 12). Substantially complete coverage of carbon is advantageous for blocking the electrolyte and confining the majority of SEI formation to the outer surface of the microbeads. It is evidenced by the observation that the Si signal can barely be detected with XPS, a surface sensitive technique (FIG. 2g). Interestingly, carbon was present at the interior of the microbeads as well (FIG. 2e,f), acting as a mechanically robust conductive framework. This is due to the progressive RF polymerization in solution; resorcinol and formaldehyde diffuse into the inner space of the microbeads through packing gaps and form RF polymer coating both outside and inside. As a result of this mechanism, the carbon coating is thicker at the surface than in the middle (FIG. 11). This is beneficial to its functions because the thick carbon at the surface fills the packing gap and blocks the electrolyte, while the interior includes thin carbon to conduct Li and e⁻ while keeping the Si content in the composite as high as possible. The Si content is determined to be, depending on the carbon coating thickness, about 60~91% by mass according to TGA (FIG. 2h) in air, which oxidizes the carbon to become gaseous $CO_2$ but with little oxidation of Si. Thinner carbon gives lower carbon content in the composite, and increases both the specific capacity and the first cycle CE (FIG. 13). In some embodiments, RF-20 (the number 20 denotes the amount of added resorcinol in the polymer coating operation, see Methods section in the Examples) has a lower threshold amount of carbon (about 9% by mass) to support the secondary particle morphology. Its reversible capacity reaches about 2465 mAh g$^{-1}$ with respect to the total mass of Si and C in pomegranate structure, while the first cycle CE reaches about 82% when delithiated to about 2V. RF-40, containing about 23% carbon by mass, has better coverage of carbon. It gives about 2285 mAh g$^{-1}$ capacity and about 75% initial CE. The relatively high first cycle CE compared to bare Si nanostructures makes Si pomegranates desirable for full cell application, because less cathode materials can be included to compensate for the initial Li loss at the anode. In addition, the CE is expected to be further increased by performing pre-lithiation or replacing carbon with another material that is inert against Li.

Figure 3:
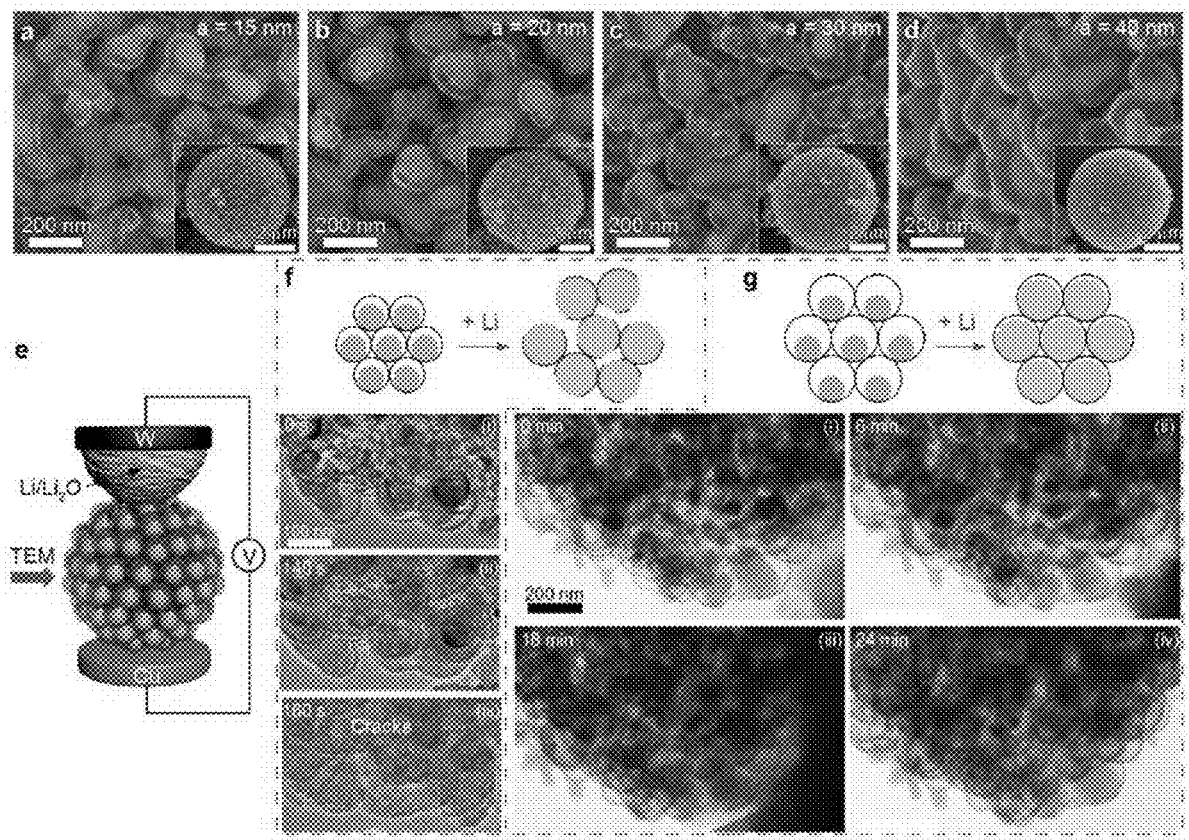
FIG. 3: Tuning of the void space size of Si pomegranates and in situ TEM characterization during lithiation. a-d, SEM images of as-synthesized Si pomegranates with gap size (or void space size) of about 15 (a), about 20 (b), about 30 (c), and about 40 nm (d), respectively. The explanation of gap size is shown in FIG. 1b. e, Schematic of the in situ TEM device. f, Schematic and time-lapse images of the lithiation of Si pomegranates with insufficient (about 15 nm) void space. Li transports along and across the carbon framework to react with the SiNPs inside, causing volume expansion. Because the void space is insufficient, the carbon framework is ruptured by the expansion of Si, and the overall morphology is degraded. g, Lithiation of a Si pomegranate with sufficient (about 40 nm) void space, in which case the SiNPs expand within the carbon framework, and the carbon framework does not rupture. The secondary particle morphology is therefore intact upon lithiation.

Though a robust carbon framework is desirable, sufficient and well-defined internal void space is also desirable for maintaining the structural integrity of the Si anode. Si pomegranates with various gap sizes have been fabricated by tuning the thickness of the $SiO_2$ sacrificial layer. FIG. 3a-d show the Si pomegranate fabricated with about 80 nm diameter nanoparticles and a gap size a ranging from about 15 nm to about 40 nm (empty volume corresponding to about 62% to about 87% of Si pomegranates), with the same secondary particle morphology and similar size. More generally, the gap size can be in the range of about 1 nm to about 150 nm, such as from about 10 nm to about 100 nm, from about 15 nm to about 100 nm, from about 20 nm to about 100 nm, from about 20 nm to about 90 nm, from about 20 nm to about 80 nm, from about 20 nm to about 70 nm, from about 20 nm to about 60 nm, from about 25 nm to about 60 nm, from about 25 nm to about 55 nm, from about 25 nm to about 50 nm, or from about 30 nm to about 40 nm. The conformal carbon coating can be seen on the particles. If the void space between carbon and silicon is insufficient, the expanded Si can rupture the carbon shell and degrade the secondary particle structure. To verify this assumption and identify the threshold gap size, in situ TEM experiments were conducted. The in situ TEM setup is schematically shown in FIG. 3e. A single Si pomegranate structure was mounted on the tip of a sharpened copper wire and Li metal, which was covered by $Li_2O$ during a short exposure to air, and was mounted on the tip of a tungsten wire. Using a specialized sample holder in the TEM chamber, the pomegranate and the Li metal electrode were brought into contact, and a bias was applied, causing the micro-battery to start discharging. Time-lapse TEM images were taken of a section of the Si pomegranate with insufficient (about 15 nm) gap size as shown in FIG. 3f. The expanded Li—Si first occupies all the void spaces and then ruptures the carbon shell and causes structural degradation. Cracks in the carbon shell usually form near larger SiNPs, because of larger gap sizes to accommodate the volume expansion. This kind of crack formation in a conventional battery configuration can cause: (i) excessive formation of SEI; (ii) loss of electrical connection to the active material; and (iii) whole-electrode level cracking due to accumulated particle shuffling across the thickness of the electrode. In the case of sufficient gap size (FIG. 3g), however, Si expands inside the carbon framework to occupy the void spaces without cracking the carbon shell, resulting in little change of the secondary particle size. The carbon shell remains intact after the expansion of Si. Taking into account the initial size of SiNPs (about 80 nm) and their size distribution, Si pomegranates with about 30-40 nm gap size can be particularly desirable, and this gap size is chosen for further electrochemical characterization.

Figure 14:
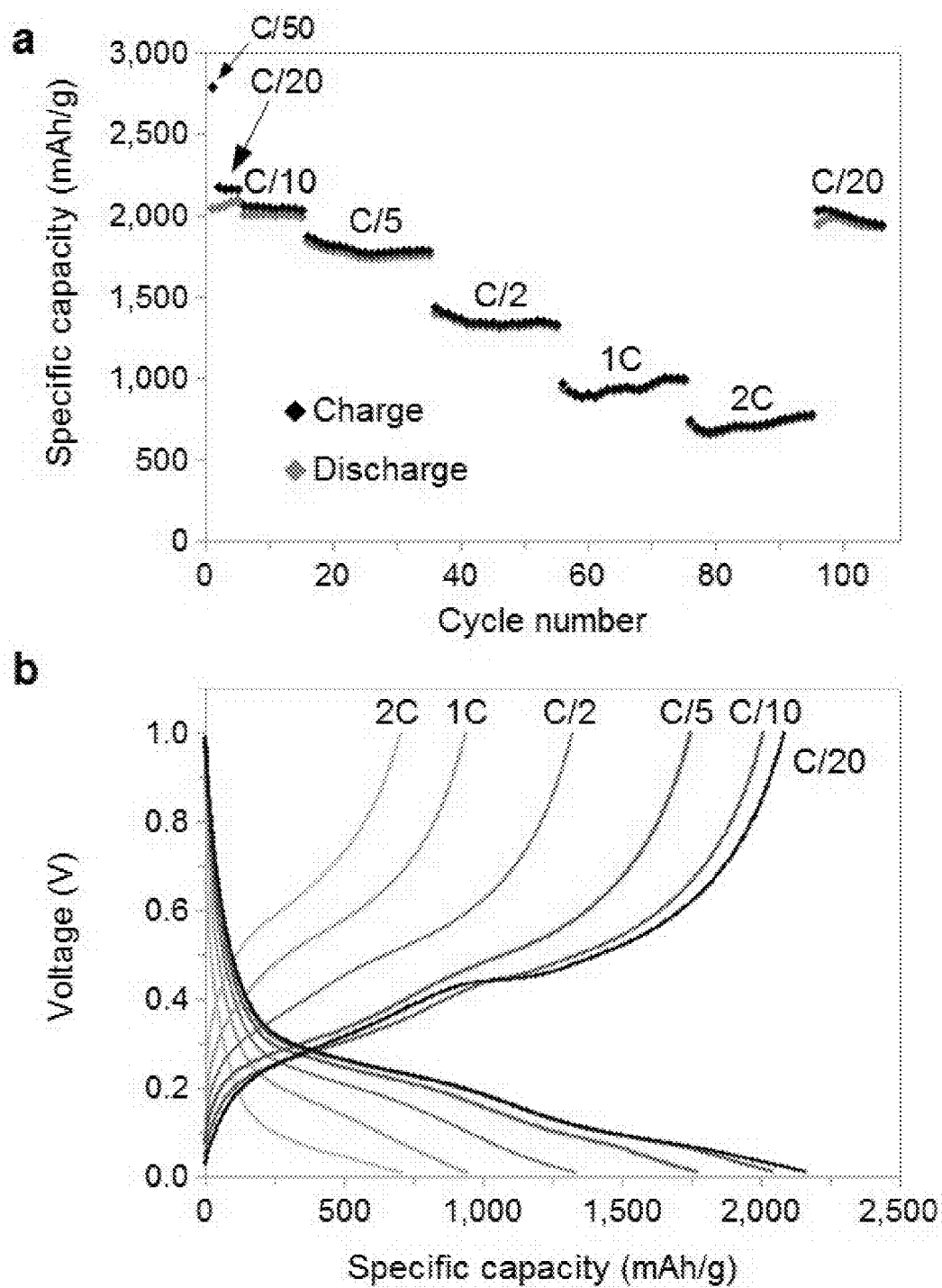
FIG. 14: Specific capacity (a) and voltage profiles (b) of the Si pomegranate anode cycled at various rates from C/50 to 2C in the potential window of about 0.01 to about 1 V versus $Li/Li^+$. $1C=4.2$ A $g^{-1}$ Si.

The observation that the SiNPs in the middle of the secondary particle are active upon lithiation indicates effective Li transport along and across the carbon shell and framework. Indeed, the lithiation time of a Si pomegranate structure is less than about 30 min (FIG. 3g), corresponding to about 2C (1C=charge/discharge in 1 hour). The small size of the primary nanoparticles and the conductive carbon framework synergistically lead to good kinetics, as also evidenced by the rate performance of half cells shown in FIG. 14.

Figure 4:
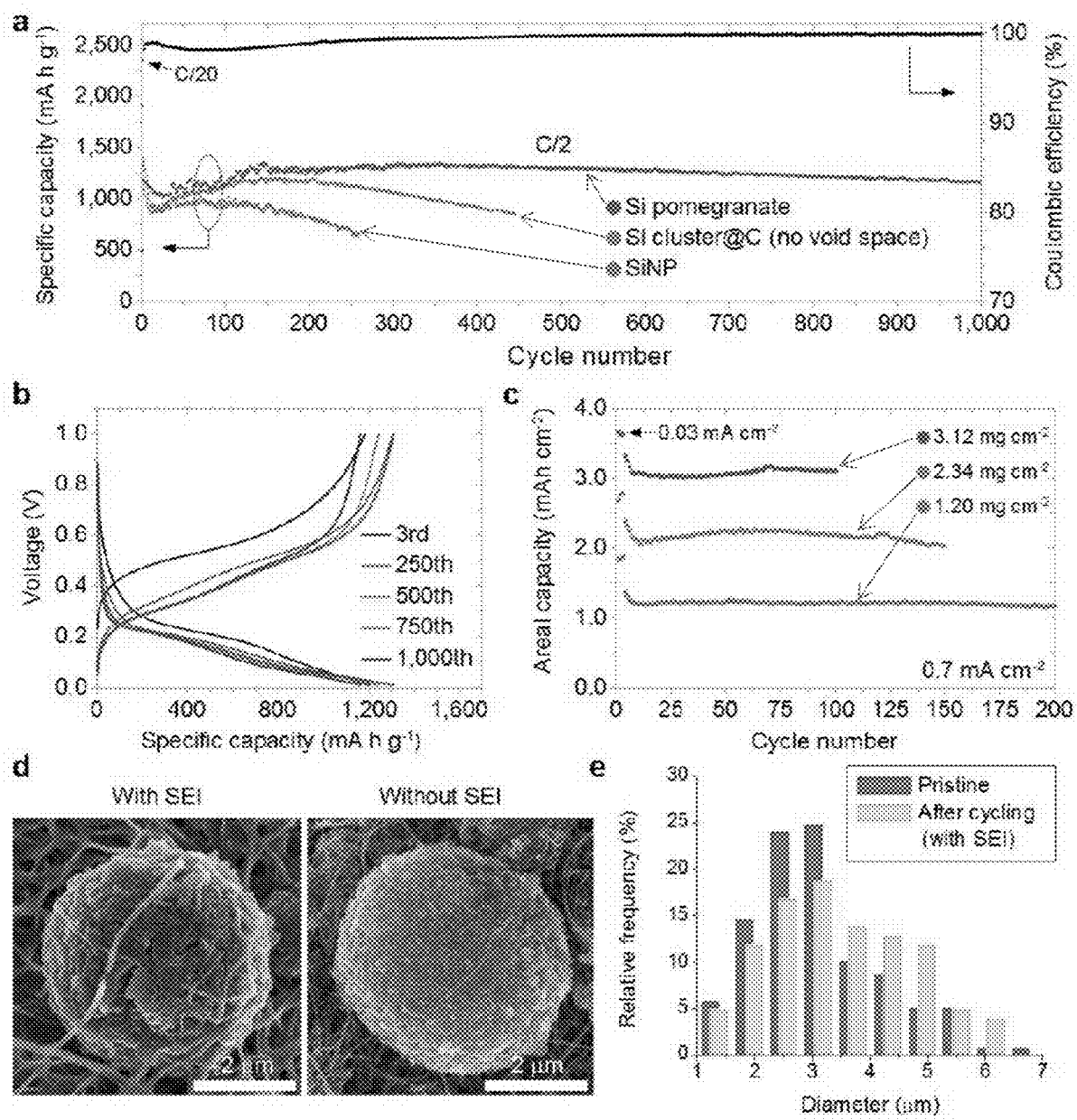
FIG. 4: Electrochemical characterization of Si pomegranate anodes. All the specific capacities of Si pomegranate anodes are based on the total mass of the active materials (Si and C in the pomegranate structure). a, Reversible delithiation capacity for the first 1000 galvanostatic cycles of Si pomegranate and other structures tested with the same conditions. CE is plotted for Si pomegranate only. The active material mass loading was about 0.2 mg cm$^{-2}$. The rate was C/20 for the first cycle, and C/2 for later cycles. 1C=4.2 A g$^{-1}$ active material. b, Voltage profiles of Si pomegranate plotted for the third, 250th, 500th, 750th, and 1000th cycles. c, High areal mass loading test (up to about 3.12 mg cm$^{-2}$ active material) of Si pomegranate anodes. All electrodes were first cycled at about 0.03 mA cm$^{-2}$ for three cycles and about 0.7 mA cm$^{-2}$ for later cycles. d, Typical SEM images of Si pomegranates after 100 cycles. e, Statistical analysis of Si pomegranate diameter before and after 100 cycles, with averages of about 3.1 µm and 3.4 µm, respectively.

The pomegranate design affords superior battery performance. As shown in FIG. 4a, its reversible capacity reached about 2350 mAh g$^{-1}$ at a rate of C/20. Unless noted otherwise, the reported capacity are based on the total mass of Si and C in pomegranate structure. Since Si is about 77% of the mass of the pomegranate structure, the capacity with respect to Si is as high as about 3050 mAh g$^{-1}$. The volumetric capacity was determined to be about 1270 mAh cm$^{-3}$, which is more than twice of about 620 mAh cm$^{-3}$ for graphite anodes. More generally, the volumetric capacity of the pomegranate structure at a rate of C/20 (or at another higher or lower reference rate and as evaluated relative to Li/Li+ or another counter/reference electrode) is at least about 650 mAh cm$^{-3}$, at least about 700 mAh cm$^{-3}$, at least about 800 mAh cm$^{-3}$, at least about 900 mAh cm$^{-3}$, at least about 1000 mAh cm$^{-3}$, at least about 1050 mAh cm$^{-3}$, at least about 1100 mAh cm$^{-3}$, at least about 1150 mAh cm$^{-3}$, at least about 1200 mAh cm$^{-3}$, or at least about 1250 mAh cm$^{-3}$, and up to about 1300 mAh cm$^{-3}$, up to about 1350 mAh cm$^{-3}$, or more. From the second cycle to the 1000$^{th}$ cycle at a rate of C/2, the capacity retention was more than about 97%. After 1000 cycles, over about 1160 mAh g$^{-1}$ still remained, which is more than about three times the theoretical capacity of graphite. This is among the best cycling performance of Si anodes reported to date. And it was achieved with conventional polyvinylidene fluoride (PVDF) binder, which can be considered a non-optimized binder for Si anodes. More generally, the retention of discharge capacity is such that, after 1000 cycles at a rate of C/2 (or at another higher or lower reference rate), at least about 60%, at least about 70%, at least about 75%, at least about 80%, at least about 85%, at least about 90%, or at least about 95%, and up to about 98%, up to about 99%, or more of an initial, maximum, or other reference discharge capacity (e.g., at the 2$^{nd}$ cycle) is retained. With the same conditions, secondary particles without internal void space (SiNP clusters directly coated by carbon) had significant decay after 200 cycles. Bare SiNPs decayed even quicker. The voltage profiles of the third, 250$^{th}$, 500$^{th}$, 750$^{th}$, and 1000$^{th}$ cycles of Si pomegranate electrodes are shown in FIG. 4b. The electrodes exhibited typical electrochemical features of Si, with little change over 1000 cycles. CE is an indicator of the reversibility of the electrode reaction, and SEI rupture and re-formation usually result in decreased CE, especially in later cycles. The average CE from the 500$^{th}$ to 1000$^{th}$ cycles of the Si pomegranate anode shown in FIG. 4a is as high as about 99.87%. At a rate of C/2, this CE is superior to other designs. More generally, the initial CE at the rate of C/2 (or at another higher or lower reference rate) is at least about 60%, at least about 65%, at least about 70%, at least about 75%, or at least about 80%, and up to about 85%, up to about 90%, or more, and the average CE from the 500$^{th}$ to 1000$^{th}$ cycles is at least about 70%, at least about 80%, at least about 85%, at least about 90%, at least about 95%, at least about 98%, or at least about 99%, and up to about 99.9%, up to about 99.99%, or more.

It should be noted that specific capacity of other designs is sometimes reported by normalizing by the weight of the active materials, and low areal mass loading can be used to achieve stable cycling. However, high areal mass loading is desirable for realizing high performance based on total cell weight or volume. Therefore, thick Si pomegranate electrodes, with active material mass loading up to about 3.12 mg cm$^{-2}$ (Si and C in pomegranate structure) were tested. Upon deep cycling at about 0.03 mA cm$^{-2}$, the reversible areal capacity reached about 3.67 mAh cm$^{-2}$ (FIG. 4c), similar to if not higher than the capacity in a commercial Li-ion battery cell. From the fourth to 100th cycle at a higher rate of about 0.7 mA cm$^{-2}$, the capacity retention was as high as about 94%. After 100 deep cycles, the areal capacity was still above about 3 mAh cm$^{-2}$. At slightly lower mass loadings of about 2.34 and about 1.20 mg cm$^{-2}$, 150 and 200 stable cycles were achieved. The specific capacity of the high mass loading cell (950 mAh g$^{-1}$) is just slightly lower than that of low mass loading cell shown in FIG. 4a, which indicates that almost all the Si pomegranate is active in the thick electrode. Stable cycling of high mass-loading cell imposes harsh demand on the structural stability at the particle level, because even small changes in particle morphology could accumulate across the thickness of the electrode and cause electrode-level cracking and failure. Stable cycling at high mass loading indicates the successful design of the pomegranate structure. More generally, with active material mass loading of about 3.12 mg cm$^{-2}$ (or another mass loading in the range of about 2.8 mg cm$^{-2}$ to about 3.3 mg cm$^{-2}$), at least 50 cycles can be achieved with the areal capacity at or above about 3 mAh cm$^{-2}$, such as at least 60 cycles, at least 70 cycles, at least 80 cycles, at least 90 cycles, or at least 100 cycles. And, with active material mass loading of about 2.34 mg cm$^{-2}$ (or another mass loading in the range of about 2 mg cm$^{-2}$ to about 2.5 mg cm$^{-2}$), at least 100 cycles can be achieved with the areal capacity at or above about 2 mAh cm$^{-2}$, such as at least 110 cycles, at least 120 cycles, at least 130 cycles, at least 140 cycles, or at least 150 cycles. And, with active material mass loading of about 1.20 mg cm$^{-2}$ (or another mass loading in the range of about 1 mg cm$^{-2}$ to about 1.5 mg cm$^{-2}$), at least 150 cycles can be achieved with the areal capacity at or above about 1 mAh cm$^{-2}$, such as at least 160 cycles, at least 170 cycles, at least 180 cycles, at least 190 cycles, or at least 200 cycles.

In some embodiments, there are two interdependent characteristics of the pomegranate design that allow for the superior battery performance. The first is internally accommodated volume expansion, which retains the structural integrity of the secondary particles and stabilizes the SEI on the surface. After 100 deep cycles, the morphology of Si pomegranates was examined with SEM (FIG. 4d). Nearly perfect spherical micron-sized particles were observed with thin and uniform SEI coating the surface. After removing the SEI with acid etching, intact carbon shells with Si inside are clearly visible. Statistical analysis of the diameter of Si pomegranates before and after cycling (FIG. 4e) shows about 10% increase from about 3.1 μm to about 3.4 μm due to the formation of the SEI layer. The volume change here is much less than that of bare alloying anode and is as small as intercalation-type graphite particles, which is desirable for excellent performance in volume-change-sensitive high mass loading cells.

Figure 15:
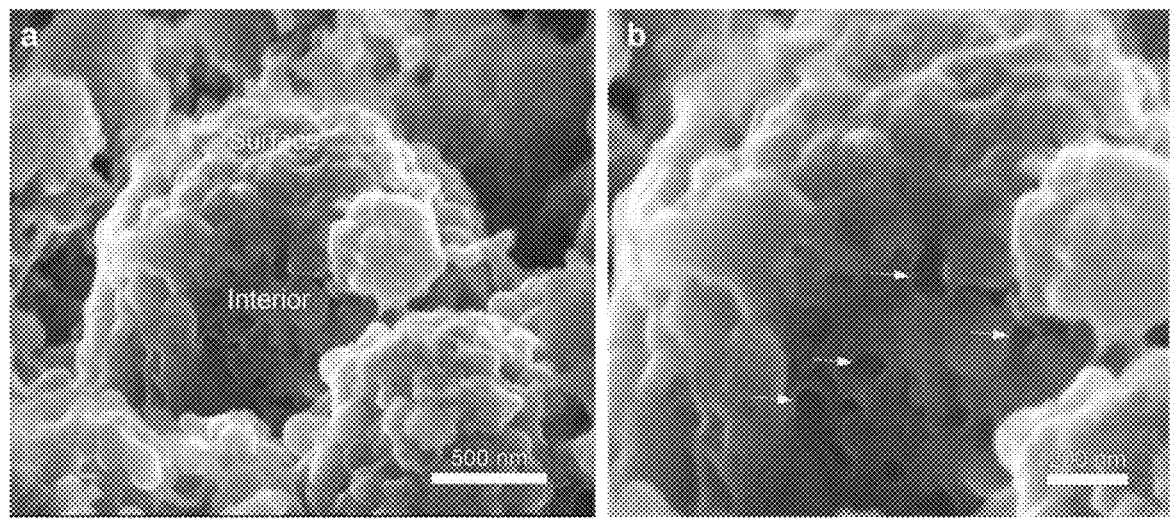
FIG. 15: Dual-beam Focused Ion Beam (FIB) analysis and cross-sectioned SEM images of a Si pomegranate after 1000 deep cycles (delithiated). The FIB cutting is vertical, and the SEM images were taken from a 52° tilted position. The arrows in (b) indicate the void spaces inside the Si pomegranate. Most of the SEI forms outside the secondary particle.
Figure 16:
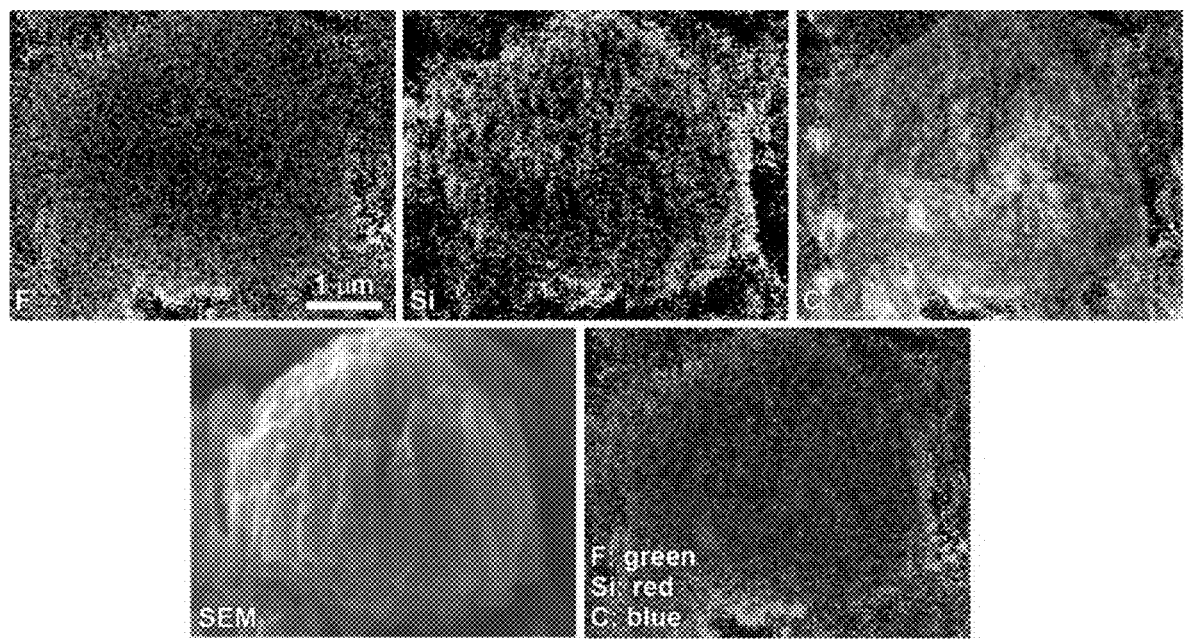
FIG. 16: Auger electron spectroscopy (AES) elemental mapping of the interior of cycled Si pomegranate. Fluorine signal is used to identify the SEI, because the electrolyte contains $LiPF_6$ and fluoroethylene carbonate. The majority of F is outside the secondary particle. The closer it is to the middle, the less F there is. The top surface of the sample was removed by Ar ion beam sputtering (5 kV, 5 µA) for 4 minutes. The ion beam is not vertical so directional scoop channels were left on the particle as seen in the SEM image (lower left).

The second characteristic is spatially confined SEI formation. Unlike other designs that have open surfaces, the pomegranate particles have an electrolyte-blocking layer, confining most of the SEI formation to the surface of the secondary particle. Because of the internally accommodated volume expansion, SEI on the secondary particle is thin and stable. This mechanism decreases the quantity of SEI, and also retains the inner void space after many cycles. Two additional experiments were conducted to further establish this point. First, focused ion beam (FIB) etching was used to expose the cross-section of a single Si pomegranate particle after cycling (FIG. 15). The void space inside the particle still remained, and most SEI formed outside the particle. Next, elemental mapping was done on the interior of a Si pomegranate using Auger electron spectroscopy (AES) (FIG. 16). By mapping fluorine, which is present in the compounds from electrolyte decomposition, it is noticed that most of the SEI is located at the surface of the secondary particle. As shown in FIG. 4e, the thickness of the outer SEI layer is ~150 nm. In addition, since the SEI is on a micron-sized secondary particle, the relative quantity of SEI is significantly reduced compared to that on primary nanostructures (FIG. 1d). The thin, stable, and spatially confined SEI increases the CE and improves the cycle stability.

Thus, some embodiments of this disclosure have been described as a pomegranate-like design for Si anodes for lithium batteries. The internally accommodated volume expansion and spatially confined SEI formation results in significantly improved performance, particularly demonstrated in the stable cycling of high areal capacity cells. In addition, the secondary particle morphology increases the tap density and decreases electrode/electrolyte contact area, for improvement of volumetric energy density and CE, respectively. Finally, the scalable fabrication process for this type of electrode renders this structure attractive for practical applications. The fabrication process is low-cost and does not require the use of expensive Si precursors or reagents. Due to the feasibility of the bottom-up synthesis, other components or additives, such as carbon nanotubes, graphene, and metal nanoparticles, can be introduced to the anode structure to provide better conductivity or behave as a buffer. It is expected that the design principles can be adopted for other high-capacity electrode materials.

Further performance improvements can be attained through conductive coatings. Electrical contact loss is one primary reason for capacity decay of Si electrodes. At a single particle level, rapid capacity decay can occur upon cycling as a result of particle fracture, which is coupled with a loss of electrical connectivity. At a whole electrode level, robust inter-particle electrical connections can be difficult to maintain due to the strain and the large volume expansion of Si upon electrochemical cycling. This problem can become even more severe when dealing with a high mass loading electrode because even small changes in particle morphology can accumulate across a thickness of the electrode. High areal mass loading of silicon anode materials is desirable for practical batteries, such as with an areal capacity at or above about 3 mAh cm$^{-2}$.

In some embodiments, an electrical conductivity of Si particles can be enhanced by coating with conductive materials. The coating can increase the electrical conductivity, buffer the large volume change, form a stable SEI, and mitigate against aggregation of Si particles. The use of a conductive metal coating (e.g. silver, copper, iron, cobalt, and so forth) can result in better capacity retention, higher CE, and better rate performance. Among them, copper is a desirable coating material due to its high electrical conductivity of about $5.96 \times 10^5$ S cm$^{-1}$. Furthermore, copper is substantially inert in an anode, and can form a more stable SEI with fewer side reactions.

Figure 17:
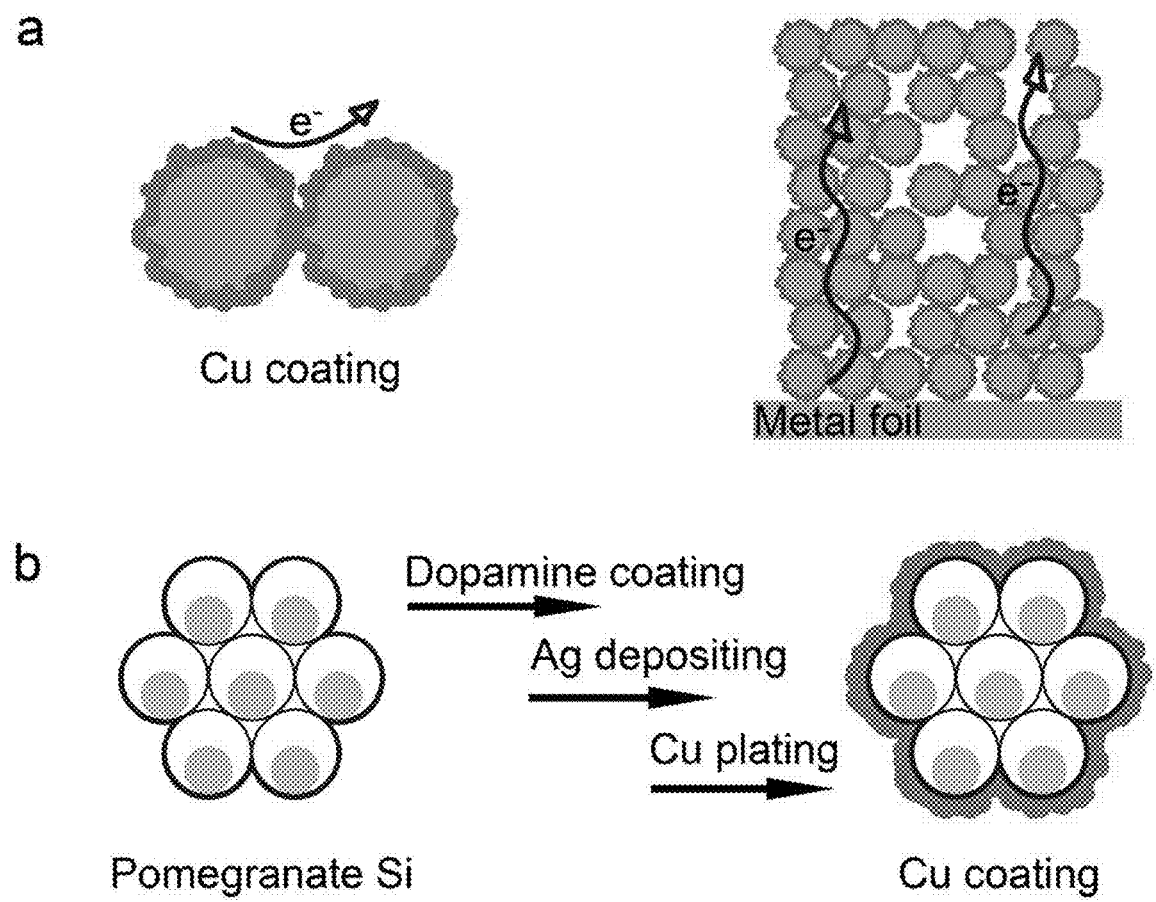
FIG. 17: Schematic of copper coating design and procedure. (a) Copper coating enhances the inter-particle electrical conductivity. In a conventional slurry coated electrode, electrical contact between particles can be diminished by volume changes or SEI formation during cycling. Copper coating maintains electrical pathways for the whole electrode, which is even more important for the electrode with a high mass loading. (b) A general procedure of electroless copper plating on pomegranate structures.

In some embodiments, a convenient, scalable electroless plating method is developed for substantially uniform copper coating on Si pomegranate structures. The synthetic approach is described as the following: polydopamine coating, silver deposition, and copper plating. Since polydopamine coating can be applied on various types of surfaces, this copper plating method is correspondingly applicable to a variety of materials. The copper-coated Si pomegranate structures are tested as an active anode material in lithium-ion battery half cells. Copper coating enhances the inter-particle electrical conductivity and maintains electrical pathways at the whole electrode level (FIG. 17a). As a result, the copper-coated structure exhibited excellent electrochemical performances, including a stable cycling performance at a high mass loading (e.g., an areal capacity of at least about 3.13 mAh cm$^{-2}$ at a mass loading of at least about 4.10 mg cm$^{-2}$ after 100 cycles), and excellent rate capability (e.g., at least about 861 mAh g$^{-1}$ at 1C rate and at least about 467 mAh g$^{-1}$ at 4C rate). This copper electroless plating route can provide an effective way to form anode materials for practical batteries.

A Si pomegranate structure is selected as a starting material in view of its excellent and highly-reproducible electrochemical performance. The copper electroless plating was then performed via the following three operations (FIG. 17b): i) polydopamine coating; ii) silver adsorption; iii) copper electroless plating. Immersion of Si pomegranates is carried out in a dilute aqueous dopamine solution at a pH of about 8.5, which resulted in spontaneous deposition of a thin adherent polymer film. Then Ag(I) was adsorbed and reduced by polydopamine layers to form Ag nanoparticles as catalytic sites. After filtration, the surface-activated Si structures were dispersed in a copper stock solution to perform the electroless plating. The amount of copper deposited was controlled by the deposition time (e.g., about 5 min to about 1 h). The copper-coated Si pomegranate structures were annealed at about 400° C. for 1 h under argon atmosphere. More generally, annealing can be carried out at a temperature in the range of about 200° C. to about 600° C. or about 300° C. to about 500° C. and for about 5 min to about 3 h or about 5 min to about 2 h under an inert atmosphere.

Figure 18:
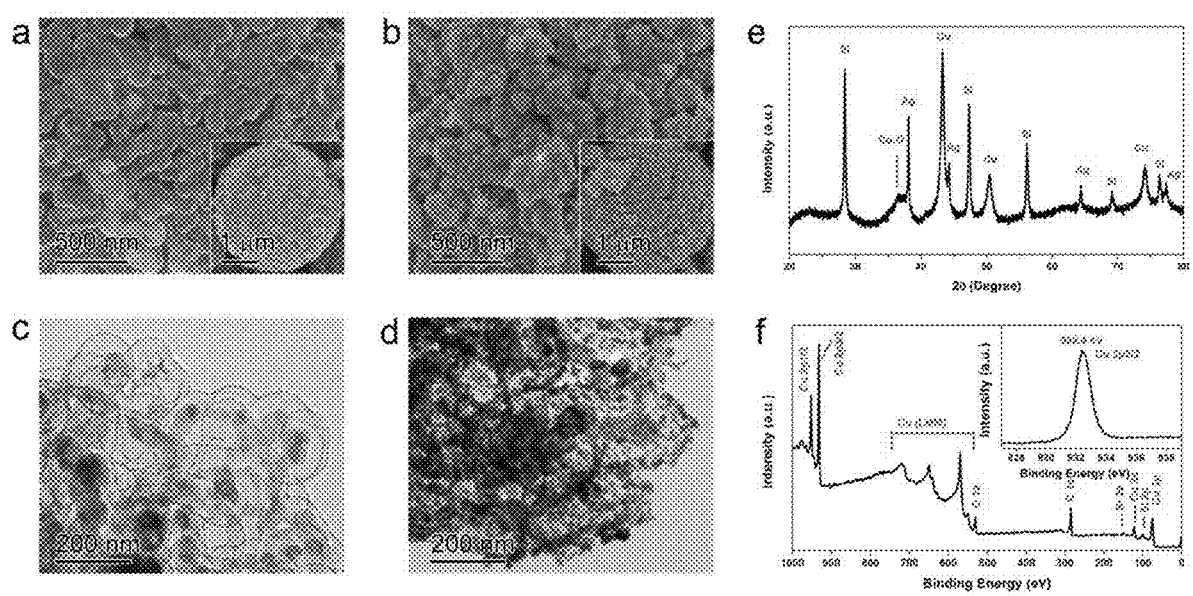
FIG. 18: Characterization of copper-coated Si pomegranate structures. (a) and (c) SEM and TEM images of Si pomegranates. (b) and (d) SEM and TEM images of copper-coated Si pomegranates. (e) and (f) X-ray Diffraction (XRD) patterns and XPS analysis of copper-coated pomegranates.

Typical SEM images of Si pomegranate structures and copper-coated samples are shown in FIG. 18a-b. The surface of pomegranate structures becomes rough after electroless plating, indicating the presence of copper nanoparticles. TEM image in FIG. 18d shows copper nanoparticles with average diameter of about 50 nm were substantially uniformly coated on the structure surface. The energy-dispersive X-ray spectroscopy (EDS) shows a typical weight % of Si and Cu was about 68.6 and about 31.4 respectively, which was also confirmed by inductively coupled plasma mass spectrometry (ICP-MS). The measured weight % of Si and Cu from ICP-MS was about 71.4 and about 28.8 respectively. To confirm the presence of copper nanoparticles, X-ray diffraction (XRD) patterns of copper-coated structures were obtained. As indicated in FIG. 18e, the presence of copper is confirmed by the presence of peaks at 2θ of about 43.2°, about 50.4°, and about 74.1°. The other diffraction peaks belong to crystalline Si, Ag, and a small amount of copper oxide (Cu$_x$O). X-ray photoelectron spectroscopy (XPS) also confirmed the presence of copper on the pomegranate surface. The presence of binding energy peak in XPS spectrum (FIG. 18f) at about 932.4 eV corresponds to Cu 2p$_{3/2}$.

In some embodiments, copper nanoparticles (or other nanoparticles of a conductive material) have a spherical or spheroidal shape, although other shapes are contemplated. Copper nanoparticles can have an outer lateral dimension (e.g., an outer diameter, an outer lateral dimension along a major axis, an averaged outer lateral dimension along a major axis and a minor axis, or another characteristic outer lateral dimension) in the range of about 1 nm to about 200 nm, such as about 5 nm to about 150 nm, about 5 nm to about 100 nm, about 10 nm to about 100 nm, about 20 nm to about 100 nm, about 30 nm to about 100 nm, about 40 nm to about 100 nm, about 50 nm to about 100 nm, or about 60 nm to about 100 nm, and an aspect ratio (e.g., specified as a ratio of outer lateral dimensions along a major axis and a minor axis) that is less than about 5, such as no greater than about 4.5, no greater than about 4, no greater than about 3.5, no greater than about 3, no greater than about 2.5, no greater than about 2, no greater than about 1.5, or about 1. Copper nanoparticles can be fused or interconnected with one another, and, in some embodiments, a copper coating on the surface of a pomegranate structure can be a largely or substantially continuous layer or coating, such as having a thickness in the range of about 1 nm to about 200 nm, such as about 5 nm to about 150 nm, about 5 nm to about 100 nm, about 10 nm to about 100 nm, about 20 nm to about 100 nm, about 30 nm to about 100 nm, about 40 nm to about 100 nm, about 50 nm to about 100 nm, or about 60 nm to about 100 nm. More generally, pomegranate structures can be coated with other types of conductive materials in place of, or in combination with, copper, such as conductive polymers, metals (e.g., nickel, silver, iron, cobalt, and so forth), titanium oxide (doped or undoped), and other types of metal oxides, metal nitrides (e.g., titanium nitride), and metal sulfides. The coating of a conductive material can be electrically conductive, ionically conductive (e.g., with respect to Li ions or other types of ions), or both.

Figure 19:
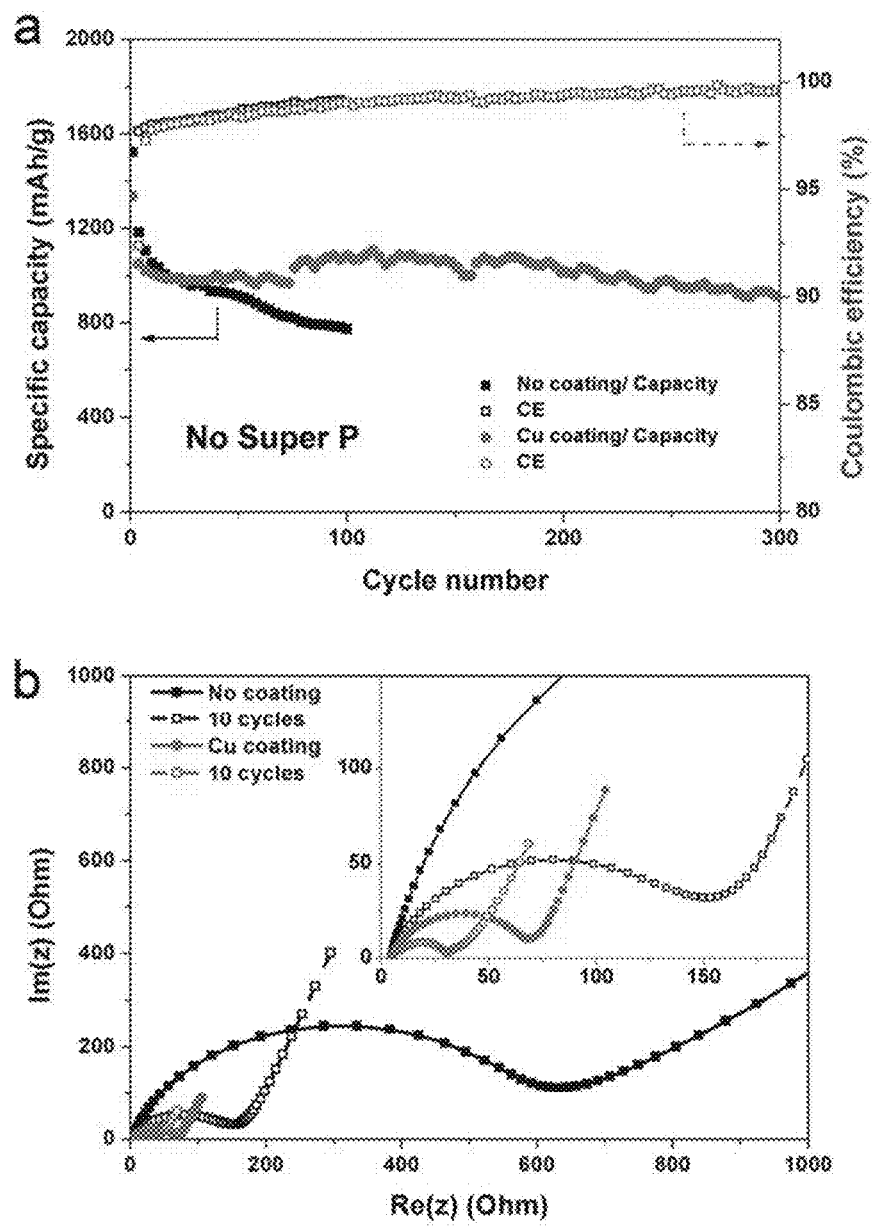
FIG. 19: Comparison of electrochemical performances between Si pomegranates and copper-coated Si pomegranates. The specific capacities of anodes are based on the mass of final composite structures (Si/C/Cu total mass in the composite structures). (a) Delithiation capacity for the galvanostatic cycles and corresponding CE without Super P additive. The mass loading was about 1 mg $cm^{-2}$. The rate was C/10 for the first three cycles and C/2 for the later cycles ($1C=4.2$ A $g^{-1}$ based on Si mass). (b) Impedance measurement before cycling and after 10 cycles.

To ascertain the improved electrochemical performance by copper coating, Si anodes were fabricated without Super P additive. FIG. 19a shows the curves of discharge capacity versus cycle number for bare (uncoated) Si pomegranates and copper-coated pomegranates. Bare Si pomegranates exhibited an initial reversible capacity of about 1552 mAh $g^{-1}$ at a rate of C/10 (1C=4.2 A $g^{-1}$ active materials). If not mentioned otherwise, the reported capacities are based on the total mass of Si/C/Cu composites. From the $4^{th}$ to $100^{th}$ cycle at a rate of C/2, the capacity degraded from about 1184 to about 758 mAh $g^{-1}$, losing about 40% capacity after 100 cycles. After copper coating, the pomegranate structures reveal a significant improvement in cycle stability. The initial reversible capacity reaches about 1338 mAh $g^{-1}$ at C/10. From the $4^{th}$ to $100^{th}$ cycle at C/2, the capacity starts at about 1051 mAh $g^{-1}$, decreases slightly for the initial 20 cycles, and then gradually increases to about 1085 mAh $g^{-1}$. After 300 cycles, over about 758 mAh $g^{-1}$ capacity remained. The capacity retention of copper-coated pomegranate is about 72% after 300 cycles, which, in contrast, is about 60% after 100 cycles for bare Si pomegranates. The excellent cycling performance even without Super P additive is attributed mainly to the copper coating, which enhance the electrical conductivity of silicon anodes. To verify this, these anodes were analyzed using alternating current (AC) impedance spectra before and after cycling, as shown in FIG. 19b. Before cycling, the impedance is largely reduced with copper coating, which can be ascribed to a better availability of electrons on the surface. After 10 cycles of charging/discharging, the impedance of copper-coated electrode is still much smaller than pristine one, further indicating copper serves as a conductive additive that can effectively reduce inner electrode resistance during cycling.

Figure 20:
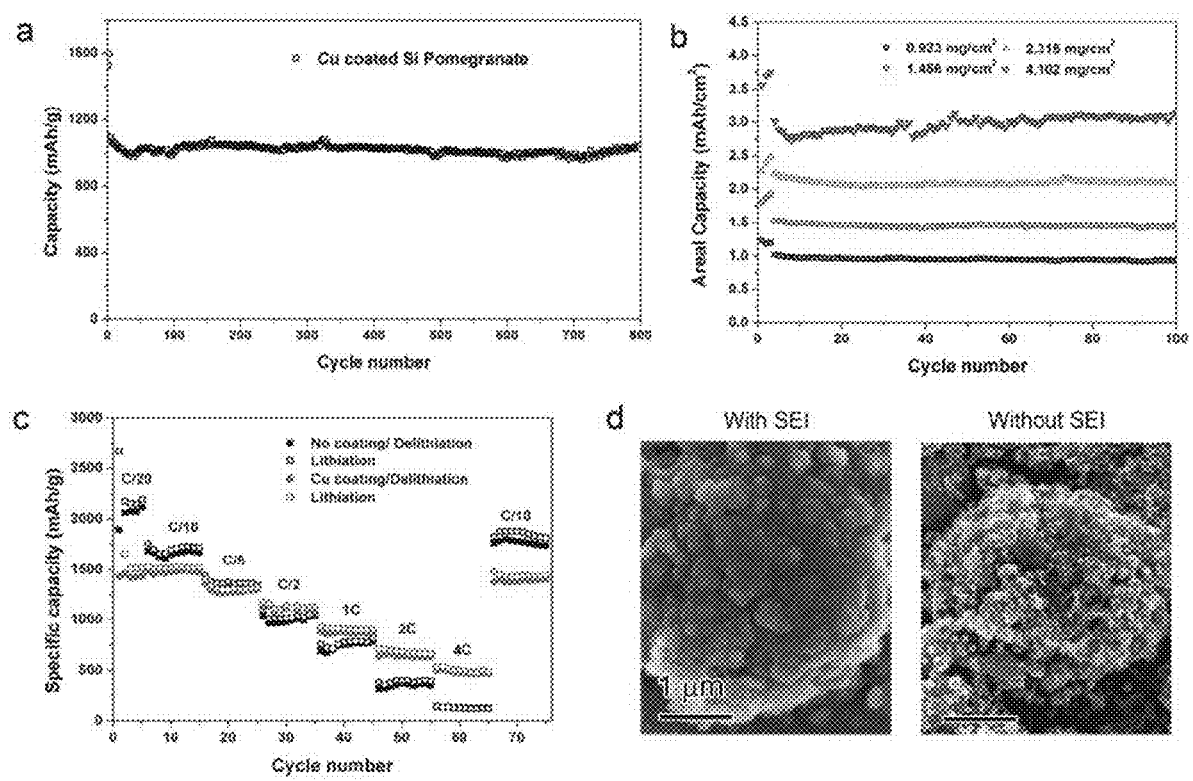
FIG. 20: Electrochemical performance of copper-coated Si pomegranate anodes. (a) Delithiation capacity for the first 800 galvanostatic cycles. The mass loading was about 1 mg $cm^{-2}$. The rate was C/20 for the first three cycles and C/2 for the later cycles. (b) High areal mass loading test (up to about 4.10 mg $cm^{-2}$ of composite material). All electrodes were cycled at 0.1 mA $cm^{-2}$ for the first three cycles and 0.5 mA $cm^{-2}$ for the later cycles. (c) Rate performance of Si pomegranate anodes with and without copper coating. (d) Typical SEM images of copper-coated Si pomegranates after 100 cycles.
Figure 21:
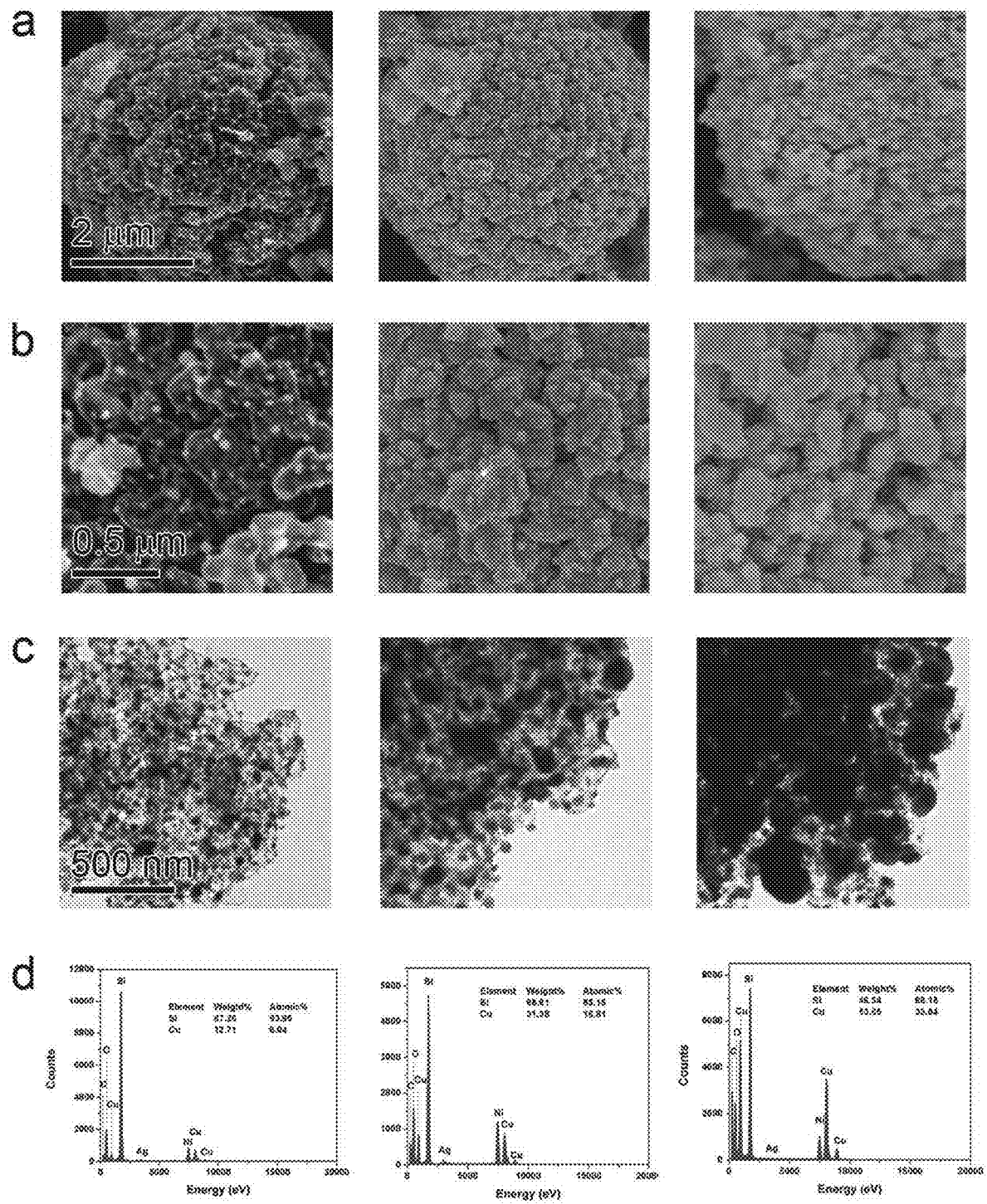
FIG. 21: Si pomegranate structures with different amounts of copper coating. (a) and (b) SEM and magnified SEM images. (c) and (d) TEM images and corresponding Energy-dispersive X-ray spectroscopy (EDS) spectra showing different ratios of silicon to copper.
Figure 22:
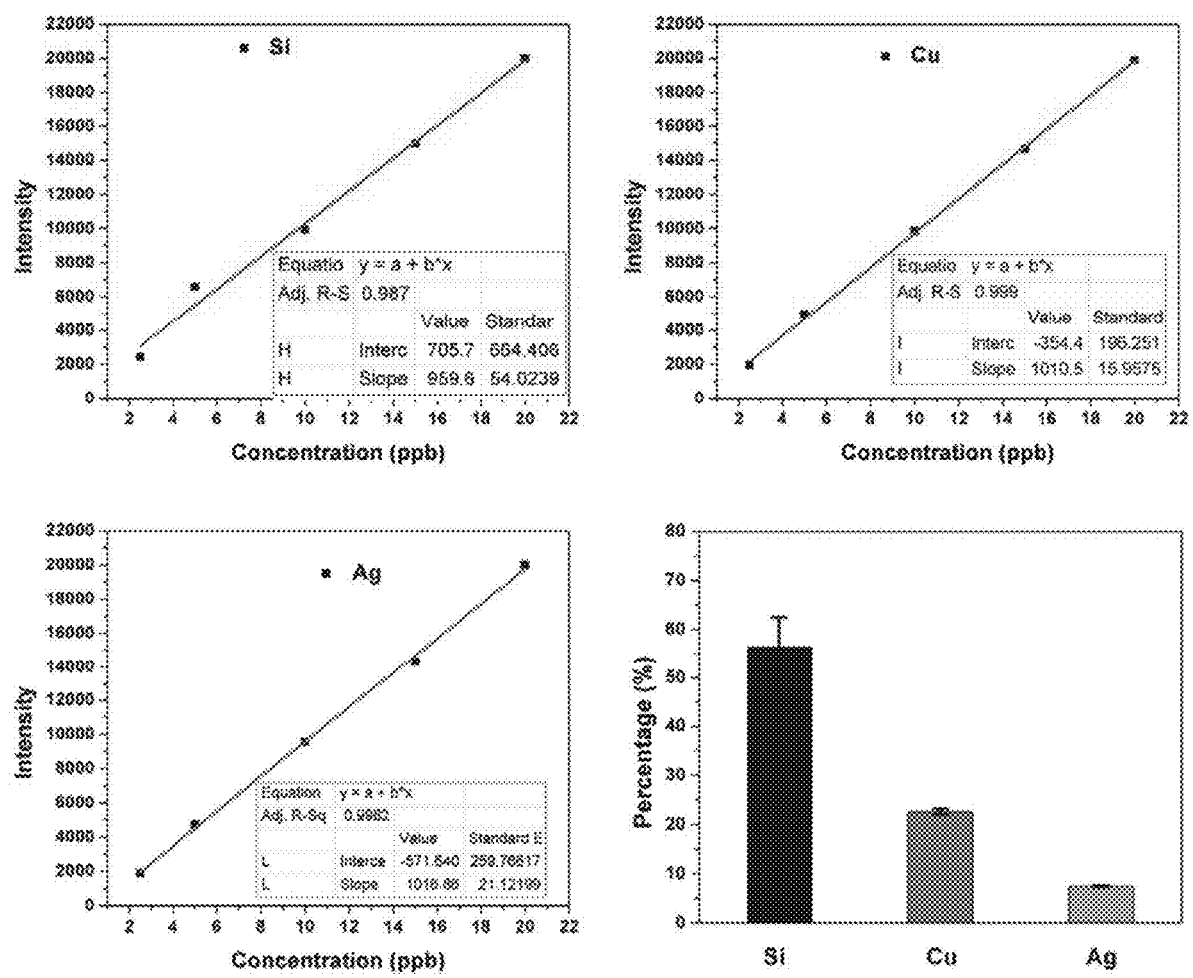
FIG. 22: Inductively coupled plasma-mass spectrometry (ICP-MS) measurement of copper-coated pomegranate structures.
Figure 23:
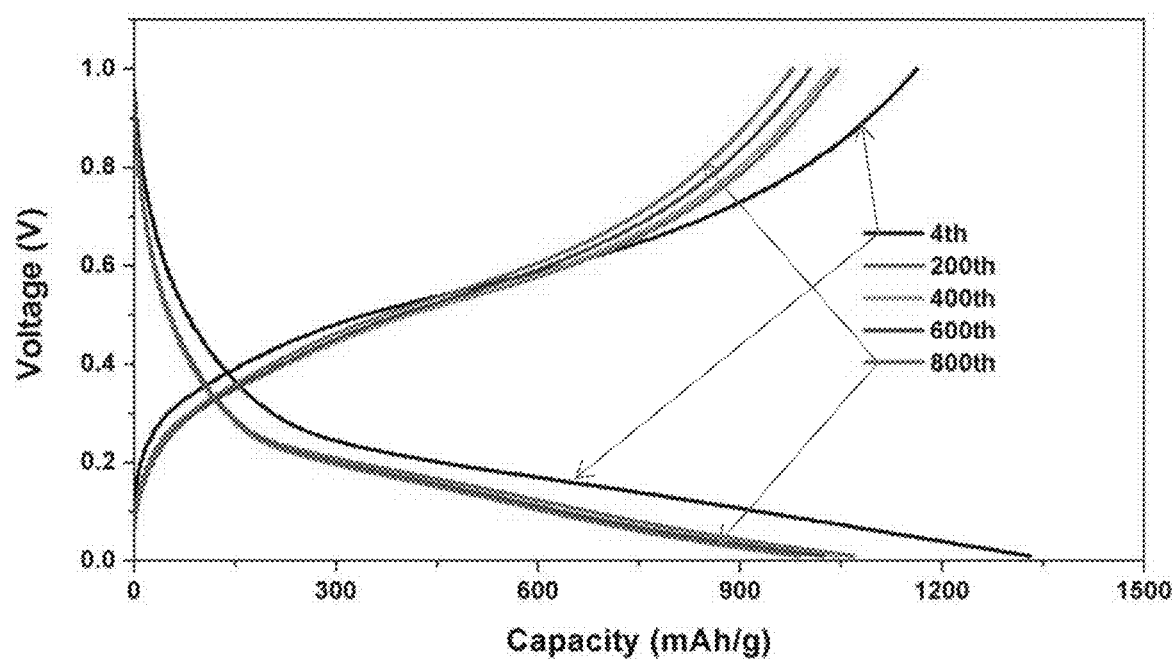
FIG. 23: Voltage profiles for copper-coated Si pomegranates plotted for the $4^{th}$, $200^{th}$, $400^{th}$, $600^{th}$, and $800^{th}$ cycles.
Figure 24:
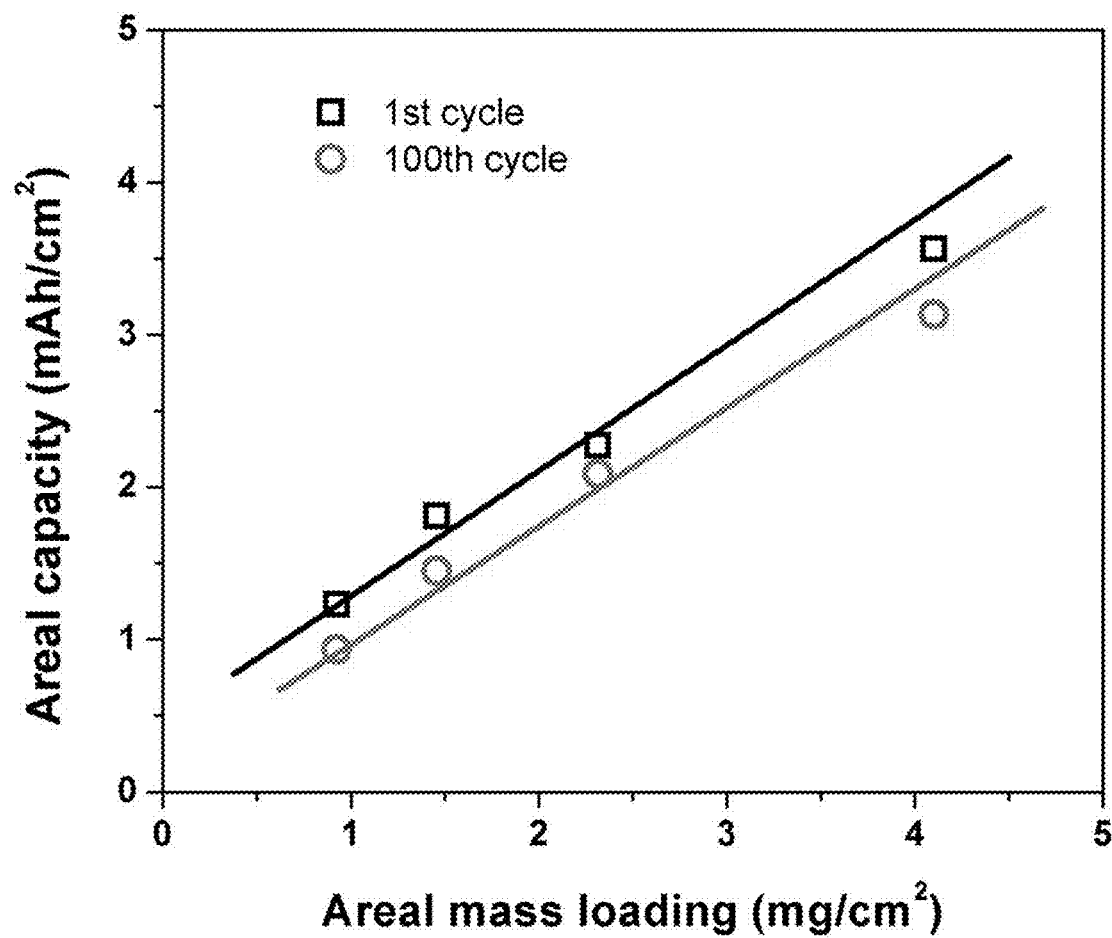
FIG. 24: Areal capacity versus areal mass loading at $1^{st}$ and $100^{th}$ cycle for copper-coated Si pomegranates.

The electrochemical cycling performance of the composite electrodes was evaluated using deep charge/discharge galvanostatic cycling from about 1 to about 0.01 V, with a mass ratio of about 80:10:10 for active materials:Super P:PVDF. As shown in FIG. 20a, an initial reversible capacity reaches about 1598 mAh $g^{-1}$ for a rate of C/20. Because mass percentage of silicon is about 56% in the composite, the capacity with respect to silicon is about 2833 mAh $g^{-1}$. From the $4^{th}$ to $800^{th}$ cycle at a rate of C/2, the capacity remains in the range from about 1162 to about 1036 mAh $g^{-1}$. After 800 cycles, over about 1000 mAh $g^{-1}$ capacity remained, which is about three times the capacity of graphite. The voltage profiles show the typical electrochemical features of silicon. The shape of profiles does not noticeably change from the $200^{th}$ to the $800^{th}$ cycle, indicating stable electrochemical behavior of copper-coated pomegranates.

High areal mass loading is desirable for practical batteries. Testing was performed on silicon electrodes with different areal mass loading of composites up to about 4.10 mg $cm^{-2}$ (FIG. 20b). A reversible areal capacity of about 3.56 mAh $cm^{-2}$ is achieved at first cycle with a current density of 0.1 mA $cm^{-2}$, corresponding to a specific capacity of about 868 mAh $g^{-1}$ based on the total mass of the Si/C/Cu composites. The capacity remains stable during the subsequent $4^{th}$ to $100^{th}$ cycles at a higher rate of 0.5 mA $cm^{-2}$, and the areal capacity remains about 3.13 mAh $cm^{-2}$ after 100 cycles, which is comparable to the capacity of a commercial battery specification. The electrodes with different areal mass loadings of about 2.32, about 1.46, and about 0.92 mg $cm^{-2}$ offer stable areal capacity of about 2.09, about 1.45, and about 0.94 mAh $cm^{-2}$, respectively. In comparison, the mass loading of bare Si pomegranates reaches as high as about 1.5 mg $cm^{-2}$ without adding other additive in the experiment. The excellent high mass loading performance can be attributed to the high electrical conductivity of electrodes originated from copper coating. More generally, with active material mass loading of about 4.102 mg $cm^{-2}$ (or another mass loading in the range of about 4 mg $cm^{-2}$ to about 4.2 mg $cm^{-2}$), at least 50 cycles can be achieved with the areal capacity at or above about 2.5 mAh $cm^{-2}$, such as at least 60 cycles, at least 70 cycles, at least 80 cycles, at least 90 cycles, or at least 100 cycles. And, with active material mass loading of about 2.315 mg $cm^{-2}$ (or another mass loading in the range of about 2.2 mg $cm^{-2}$ to about 2.4 mg $cm^{-2}$), at least 50 cycles can be achieved with the areal capacity at or above about 2 mAh $cm^{-2}$, such as at least 60 cycles, at least 70 cycles, at least 80 cycles, at least 90 cycles, or at least 100 cycles. And, with active material mass loading of about 1.456 mg $cm^{-2}$ (or another mass loading in the range of about 1.3 mg $cm^{-2}$ to about 1.5 mg $cm^{-2}$), at least 50 cycles can be achieved with the areal capacity at or above about 1.3 mAh $cm^{-2}$, such as at least 60 cycles, at least 70 cycles, at least 80 cycles, at least 90 cycles, or at least 100 cycles. And, with active material mass loading of about 0.923 mg $cm^{-2}$ (or another mass loading in the range of about 0.8 mg $cm^{-2}$ to about 1 mg $cm^{-2}$), at least 50 cycles can be achieved with the areal capacity at or above about 0.8 mAh $cm^{-2}$, such as at least 60 cycles, at least 70 cycles, at least 80 cycles, at least 90 cycles, or at least 100 cycles.

FIG. 20c shows the rate capability of a copper-coated Si pomegranate electrode. It delivers reversible capacities about 1458 and about 1450 mAh $g^{-1}$ at a low rate of C/20 and C/10; whereas bare Si pomegranate displays about 1892 and about 1670 mAh $g^{-1}$ under the same condition, due to a higher Si content in bare pomegranate (about 77%) versus copper-coated composite (about 56%). The trend is reversed at higher charge/discharge rate. Specifically, the capacity reaches about 1080 (or more), about 861 (or more), about 633 (or more), and about 476 mAh $g^{-1}$ (or more) at C/2, 1C, 2C, and 4C for copper-coated electrode, while the capacity reaches about 1036, about 779, about 345, and about 122 mAh $g^{-1}$ for bare pomegranate. Again, copper coating improves the surface electrical conductivity of silicon and provides electron percolation paths among individual pomegranates, resulting in high rate capability.

To evaluate SEI formation and morphology change of a copper-coated Si pomegranate structure, a cell was opened after cycling, and an electrode was examined under SEM (FIG. 20d). After 100 deep cycles, spherical microparticles were observed, with a thin and uniform SEI layer on the surface. Substantially uniformly coated copper nanoparticles are observed after removing the SEI with diluted acid. The whole pomegranate structure is still coated by copper. This indicates that the coating of copper nanoparticles remained in stable contact with pomegranate surface, which ensures excellent electrical conductivity in a whole electrode during cycling.

Thus, additional embodiments of this disclosure have been described as a general and scalable copper electroless plating method to enhance the electrical conductivity of Si pomegranate structures. An initial operation of polydopamine modification renders the plating method applicable on a variety of materials. Substantially uniform Ag catalytic sites provide density control over copper plating. The resulting copper-coated Si pomegranate electrode exhibits improved mass loading and improved rate capacity.

Figure 25:
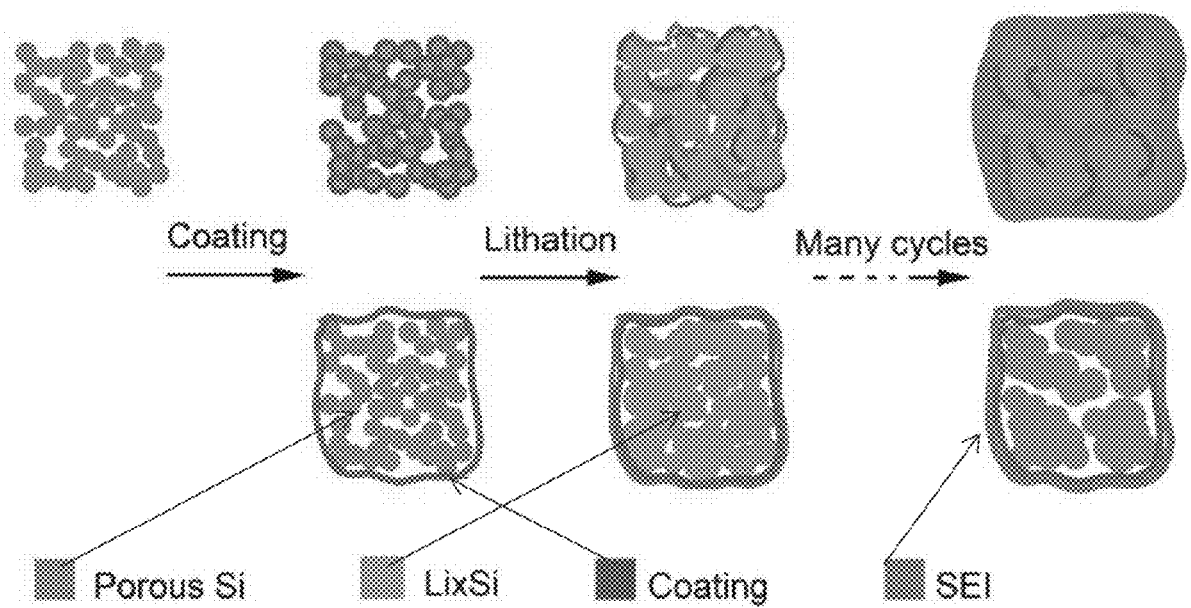
FIG. 25: Schematic of different carbon coating design on mesoporous Si microparticles (pSiMPs) and their corresponding evolution of SEI layers. For impregnation coating, carbon layer is coated on each Si nanoparticle domains. Upon first cycle lithiation, the tremendous volume expansion of Si domains breaks the coating layer, exposing silicon surface to the electrolyte. After many cycles, new SEI continues to form and finally results in a very thick SEI layer. For well-designed non-filling coating, carbon layer selectively coats on an outer surface of the microparticles, leaving enough void space for Si expansion. Upon (de)lithiation, the outer carbon layer remains intact. As a result, the SEI outside the microparticles is not ruptured during cycling and remains thin.

Non-Filling Carbon-Coated Porous Silicon Microparticles as High-Performance Anodes Other embodiments of this disclosure are directed to the design of a non-filling carbon-coated porous Si microparticle (nC-pSiMP) core-shell structure as an anode material. The core is a porous Si microparticle composed of multiple interconnected Si primary nanoparticles, and the hollow shell is a confining carbon layer that allows Li to pass through. Little or no carbon penetrates into an interior pore space of Si. Such a design offers multiple advantages as large-volume-change anode materials of some embodiments: 1) commercially available SiO microparticle source and a streamlined synthesis procedure render the process highly scalable; 2) the interconnected Si primary nanoparticles formed by thermal disproportionation of SiO microparticles ensures the size of the primary Si building blocks is less than about 10 nm (FIG. 26d), which mitigates against the fracture of the structures. Thermal disproportionation also results in densely packed primary Si nanoparticles, which allow for improved electronic conductivity among neighboring particles; 3) carbon coats the exterior surface of the Si microparticles, mitigating against electrolyte diffusion into the interior pore space and restricting SEI formation to the outer surface; 4) non-filling coating retains enough internal void space to accommodate the volume expansion of Si nanoparticles, and keeps the carbon shell intact during the electrochemical cycling (FIG. 25); and 5) non-filling coating introduces less carbon to the composites, which increases specific capacity, and also decreases the first-cycle irreversible capacity loss.

Figure 28:
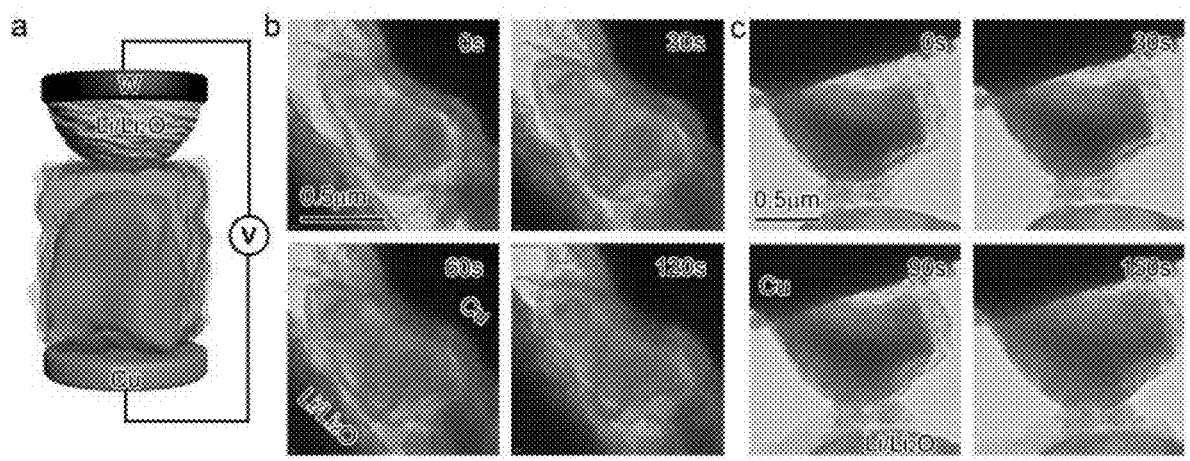
FIG. 28: Volume expansion of nC-pSiMPs during lithiation characterized by in situ TEM. (a) schematic of an in situ TEM device. (b) The time-lapse images of the lithiation of Si particles with a size of about 500 nm. Li transports along and across a carbon layer to react with the Si inside, causing volume expansion. Because the pore structure provides enough space to accommodate this expansion, the carbon layer remains intact after full lithiation. (c) Lithiation of a nC-pSiMP with a size over about 1 μm.

In some embodiments, commercially available SiO microparticles were first conformally coated with a layer of resorcinol-formaldehyde resin (RF) in diluted ammonia aqueous solution. Then, the coated structures were heated to about 950° C. for about 4 h under argon atmosphere. More generally, heating can be carried out at a temperature in the range of about 750° C. to about 1150° C. or about 850° C. to about 1050° C. and for about 1 h to about 10 h or about 2 h to about 5 h in an inert atmosphere. During the heating process, phase separation in SiO occurs to form interconnected Si nanoparticles embedded in a $SiO_2$ matrix due to the thermal disproportionation of SiO. In conjunction, the RF was converted to a carbon shell to coat the as-formed $Si/SiO_2$ composites. After removing $SiO_2$ matrix with HF solution (or another acid or etchant solution), enough void space was generated to allow Si expansion without breaking the outer carbon layer. The advantages of this material preparation are noted. First, the chemical sources used in the synthesis (SiO microparticle, resorcinol, formaldehyde, ammonia, and HF) are available industrially with low cost, providing the path for mass production. Second, the carbon conversion and SiO thermal disproportionation are achieved in one heating operation, saving energy during the preparation process. Third and of particular note, void space is formed by SiO disproportionation and HF etching without any intentionally added templates. The void space volume is sufficient for Si expansion, as estimated by chemical equation of SiO thermal disproportionation (see below) and evidenced by in-situ TEM results shown in FIG. 28.

Figure 26:
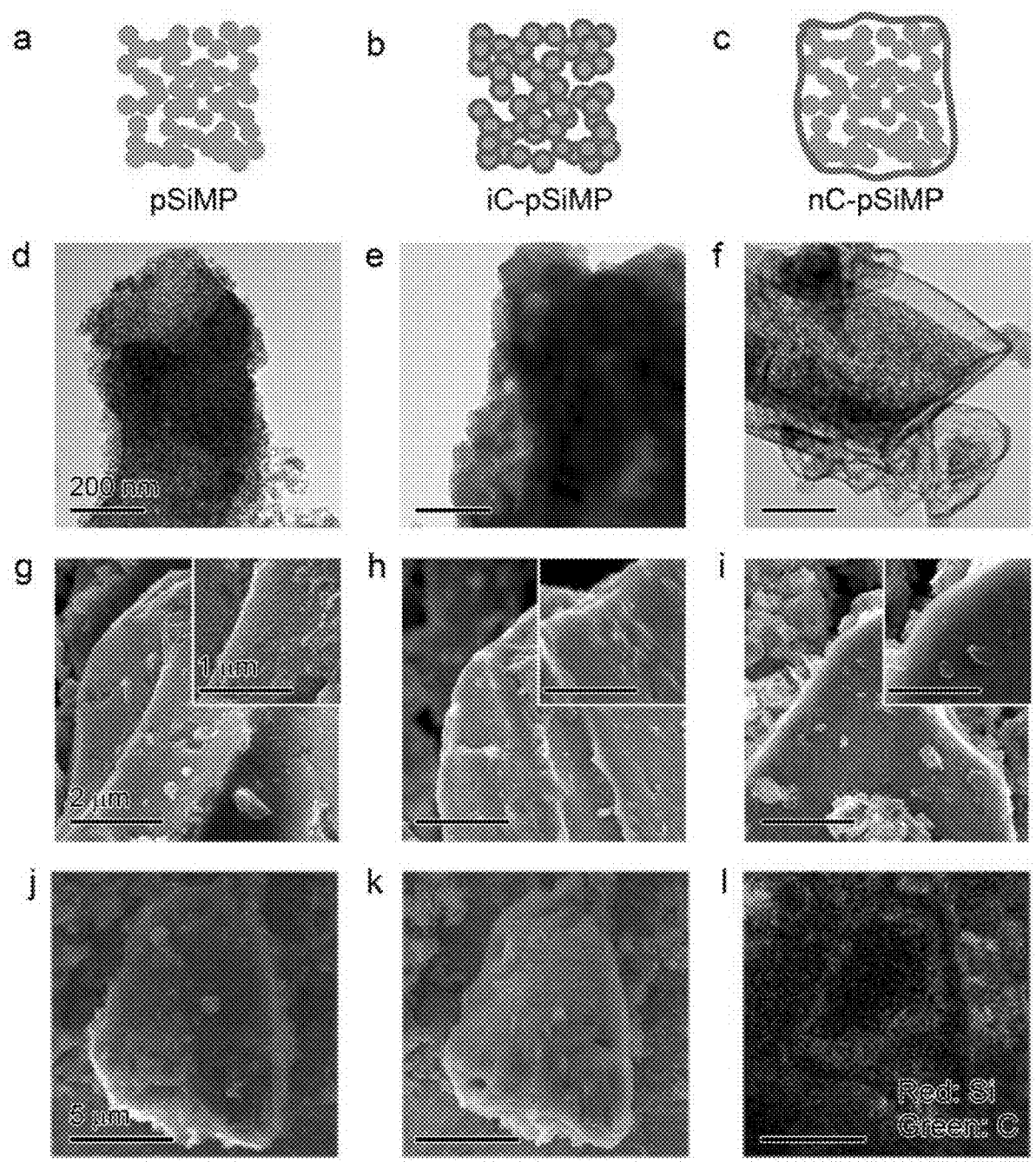
FIG. 26: Morphology characterization of pSiMPs with different coatings. Schematic, TEM, and SEM images of pSiMPs without coating (a, d, and g), impregnation carbon coating (iC-pSiMP) (b, e, and h), and non-filling carbon coating (nC-pSiMP) (c, f, and i). Insets are magnified SEM images showing the surface of the microparticles. (j-l) Auger electron spectroscopy (AES) elemental mapping of nC-pSiMPs. (j) original sample. (k) a top surface was removed by Ar ion beam sputtering (5 kV, 5 mA) for about 4 minutes. (l) AES elemental mapping after removing surface. The majority of carbon signals are outside the microparticles, showing that very little carbon penetrated into the pore space of Si microparticles.

For a comparison of structure morphology, porous silicon microparticles were prepared with different carbon coatings: no coating, impregnation coating, and non-filling carbon coating, denoted as pSiMP, iC-SiMP and nC-SiMP, respectively. (FIG. 26a-c). Representative TEM and SEM images are shown in FIG. 26d-i. Without carbon coating, the porous nature of the microparticles is evident in TEM (FIG. 26d) and the enlarged SEM images in the inset (FIG. 26g). The interconnected Si nanoparticles are highly uniform with most nanoparticles less than about 10 nm. The porous nature of the microparticles is not evident in FIG. 26e and FIG. 26h because of carbon penetration into the interior pore space. For the non-filling coated structure, the feature of interconnected Si nanoparticles is evident again because the carbon layer selectively wraps around the outer layer of the microparticle, as shown in FIG. 26f. The SEM images (FIG. 26g-i) show that the morphology of microparticles is stable during the polymer coating, thermal disproportion, and HF etching processes. Auger electron spectroscopy (AES) elemental mapping of the interior of nC-pSiMPs was utilized to further confirm the carbon distribution in the composite structures (FIG. 26j-l). After the outer carbon surface was removed by Ar ion beam sputtering (5 kV, 5 mA) for 4 minutes, weak carbon signals were observed, indicating that little carbon penetrates into the interior of Si porous structures.

X-ray diffraction (XRD) measurement (FIG. 27a) indicates that the nC-pSiMP has a pure silicon phase (JCPDS card No. 27-1402). Calculation with the Debye-Scherrer formula using the strongest peak (2θ=28.5°) gives a grain size of less than about 5 nm for the samples. This is consistent with TEM images showing that the microparticles are composed of silicon nanoparticle domains. Raman spectroscopy (FIG. 27b) shows three peaks at about 499, about 1340, and about 1583 $cm^{-1}$, corresponding to silicon and carbon D and G bands, respectively. X-ray photoelectron spectroscopy (XPS, FIG. 27c) also demonstrates the coexistence of silicon and carbon. Compared with carbon, the negligible signal of Si 2p in XPS analysis shows a very low surface atomic percentage of Si, indicating that the carbon coating is conformal and substantially homogenous to seal the pSiMPs. The mass percentage of silicon in the nC-pSiMP structure is found to be about 89% by thermogravimetric analysis (TGA, FIG. 27d), while the percentage decreases to about 79% in the impregnation-coated structure.

A sufficient internal void space is desirable to keep a core-shell structure intact and maintain the structural integrity of a silicon anode. To evaluate whether the void space is sufficient for the Si expansion, an in situ TEM study is performed for nC-pSiMPs with different sizes. The in situ electrochemical cell is shown schematically in FIG. 28a. FIG. 28b demonstrates a series of images taken of the in situ lithiation of the composite with a size of about 500 nm. In the first image (0 s, before lithiation), a porous Si particle is visible within a surrounding carbon shell. Then, the particle expands in volume as Li diffuses through the carbon layer and alloys with Si. The particle is partially lithiated after about 30 s. After about 1 min, the contrast inside the carbon shell exhibits little change from TEM images, indicating that the lithiation is complete. All the void space is occupied by lithiated silicon, but no fracture of the carbon shell is observed after full lithiation. For a particle size above about 1 μm (FIG. 28c), additional time is involved for the full lithiation (about 150 s). The porous micron-sized particle also provides enough void space to accommodate the Si full expansion without rupturing the outer carbon shell. These results indicate that without requiring complex design or intentional templating, the procedure can directly generate a well-defined void space together with a conformal-coated encapsulating layer. This void space is mostly occupied when Si expands in the lithiated state, optimizing the volumetric capacity of the composite. Meanwhile the carbon shell remains intact even after complete Si lithiation, mitigating against structural change of a battery anode upon cycling, and thus increasing the cycle life of a battery.

In some embodiments, a non-filling carbon-coated porous Si particle has a core-shell structure, in which the core is a porous Si microparticle (or other porous Si particle) composed of multiple interconnected Si primary nanoparticles, and the shell is a confining carbon layer that allows $Li^+$ to pass through. The confining carbon layer corresponds to a secondary particle within which the porous Si microparticle is encapsulated, and void spaces are retained in the porous Si microparticle around the Si nanoparticles, allowing the Si to expand with little or no changes to the secondary particle morphology or breaking of a SEI layer confined to an outer surface of the secondary particle.

In some embodiments, secondary particles have a spherical or spheroidal shape, although other shapes are contemplated. The secondary particles can have an outer lateral dimension (e.g., an outer diameter, an outer lateral dimension along a major axis, an averaged outer lateral dimension along a major axis and a minor axis, or another characteristic outer lateral dimension) in the range of about 100 nm to about 200 μm, such as about 100 nm to about 150 μm, about 100 nm to about 100 μm, about 200 nm to about 50 μm, about 300 nm to about 40 μm, about 300 nm to about 30 μm, about 300 nm to about 20 μm, about 300 nm to about 10 μm, about 300 nm to about 5 μm, about 300 nm to about 1 μm, or about 1 μm to about 10 μm, and an aspect ratio (e.g., specified as a ratio of outer lateral dimensions along a major axis and a minor axis) that is less than about 10, such as no greater than about 5, no greater than about 4, no greater than about 3.5, no greater than about 3, no greater than about 2.5, no greater than about 2, no greater than about 1.5, or about 1. In some embodiments, the secondary particles are largely or substantially monodisperse, such that at least about 50%, at least about 60%, at least about 70%, at least about 80%, at least about 90%, or at least about 95% of the secondary particles are within one or more of the ranges of dimensions specified above. The carbon coating or walls of the secondary particles can have a thickness in the range of about 1 nm to about 100 nm, such as about 5 nm to about 90 nm, about 10 nm to about 80 nm, about 10 nm to about 70 nm, about 10 nm to about 60 nm, about 10 nm to about 50 nm, about 10 nm to about 40 nm, or about 10 nm to about 30 nm. The secondary particles can be formed of other types of conductive materials in place of, or in combination with, carbon, such as conductive polymers, metals (e.g., copper, nickel and so forth), titanium oxide (doped or undoped), and other types of metal oxides, metal nitrides (e.g., titanium nitride), and metal sulfides. The secondary particles can be electrically conductive, ionically conductive (e.g., with respect to Li ions or other types of ions), or both.

In some embodiments, each secondary particle defines an internal volume, such as a single internal volume, with the carbon coating or wall of the secondary particle bounding the internal volume to define a substantially or largely closed volume. Si nanoparticles (or other primary particles of an electrochemically active material) are disposed within the internal volume, and are interconnected to form a larger, porous Si particle. In some embodiments, a single porous Si microparticle (or other porous Si particle) is disposed within each internal volume and, in other embodiments, more than one porous Si microparticle (or other porous Si particle) is disposed within each internal volume. Each secondary particle can encapsulate a number of Si nanoparticles (or other primary particles) that is at least 2, at least 10, at least 50, at least 100, at least 500, at least 1000, at least 5000, at least $10^4$, at least $5 \times 10^4$, at least $10^5$, at least $2 \times 10^5$, or at least $3 \times 10^5$, and up to $4 \times 10^5$, up to $5 \times 10^5$, or more.

In some embodiments, Si nanoparticles (or other primary particles) have a spherical or spheroidal shape, although other shapes are contemplated. Primary particles can have an outer lateral dimension (e.g., an outer diameter, an outer lateral dimension along a major axis, an averaged outer lateral dimension along a major axis and a minor axis, or another characteristic outer lateral dimension) in the range of about 1 nm to about 200 nm, such as about 1 nm to about 150 nm, about 1 nm to about 100 nm, about 1 nm to about 50 nm, about 1 nm to about 40 nm, about 1 nm to about 30 nm, about 1 nm to about 20 nm, about 1 nm to about 10 nm, or about 1 nm to about 5 nm, and an aspect ratio (e.g., specified as a ratio of outer lateral dimensions along a major axis and a minor axis) that is less than about 10, such as no greater than about 5, no greater than about 4, no greater than about 3.5, no greater than about 3, no greater than about 2.5, no greater than about 2, no greater than about 1.5, or about 1. A primary particle can be largely or substantially solid, or can have a void or an empty space disposed within an interior of, and at least partially surrounded by, the primary particle. Other types of nanostructures can be used in place of, or in combination with, spherical or spheroidal primary particles, such as elongated nanostructures having an aspect ratio that is at least about 5, whether solid or hollow. Primary particles can be formed of other types of electrochemically active materials in place of, or in combination with, silicon, such as other anode materials that alloy with lithium (e.g., tin, germanium, magnesium, aluminum, tin oxide, silicon monoxide, phosphorus, and so forth) and sulfur-based cathode materials.

Si nanoparticles (or other primary particles) are interconnected to form a larger, porous Si particle. In some embodiments, porous Si particles have a spherical or spheroidal shape, although other shapes are contemplated. The porous Si particles can be somewhat smaller that encapsulating secondary particles, and can have an outer lateral dimension (e.g., an outer diameter, an outer lateral dimension along a major axis, an averaged outer lateral dimension along a major axis and a minor axis, or another characteristic outer lateral dimension) in the range of about 100 nm to about 200 μm, such as about 100 nm to about 150 μm, about 100 nm to about 100 μm, about 200 nm to about 50 μm, about 300 nm to about 40 μm, about 300 nm to about 30 μm, about 300 nm to about 20 μm, about 300 nm to about 10 μm, about 300 nm to about 5 μm, about 300 nm to about 1 μm, or about 1 μm to about 10 μm, and an aspect ratio (e.g., specified as a ratio of outer lateral dimensions along a major axis and a minor axis) that is less than about 10, such as no greater than about 5, no greater than about 4, no greater than about 3.5, no greater than about 3, no greater than about 2.5, no greater than about 2, no greater than about 1.5, or about 1. In some embodiments, the porous Si particles are largely or substantially monodisperse, such that at least about 50%, at least about 60%, at least about 70%, at least about 80%, at least about 90%, or at least about 95% of the porous Si particles are within one or more of the ranges of dimensions specified above.

As noted above for some embodiments, each secondary particle defines an internal volume, and a Si material is disposed within each internal volume and occupies less than 100% of the internal volume, thereby leaving a void space to allow for expansion of the Si material (or other electrochemically active material). In some embodiments, such as for the case of a Si material in its substantially de-lithiated state (or another reference cycling state), a ratio of the volume of the void space relative to the volume of the Si material inside the internal volume is at least about 1:2, at least about 1:1, at least about 2:1, at least about 2.3:1, at least about 2.5:1, at least about 2.7:1, at least about 2.9:1, at least about 3:1, or at least about 3.1:1, and up to about 3.3:1, up to about 3.5:1, up to about 4:1, or more. In some embodiments, such as for the case of the Si material in its substantially de-lithiated state, a ratio of the volume of the void space relative to the internal volume is at least about 1:3, at least about 1:2, at least about 2:3, at least about 2.5:3.5, at least about 2.7:3.7, at least about 2.9:3.9, at least about 3:4, or at least about 3.1:4.1, and up to about 3.3:4.3, up to about 3.5:4.5, up to about 4:5, or more, with a remainder of the internal volume taken up by the Si material. In some embodiments, such as for the case of the Si material in its substantially de-lithiated state, a ratio of the volume of the Si material relative to the internal volume can be up to about 2:3, up to about 1:2, up to about 1:3, up to about 1:3.5, up to about 1:3.7, up to about 1:3.9, up to about 1:4, or up to about 1:4.1, and down to about 1:4.3, down to about 1:4.5, down to about 1:5, or less. In some embodiments, a weight ratio of the Si material (or other electrochemically active material) relative to a combined weight of the Si material and secondary particles encapsulating the Si material is in the range of about 10% to about 99%, such as from about 20% to about 98%, from about 30% to about 95%, from about 30% to about 70%, from about 40% to about 95%, from about 50% to about 95%, from about 60% to about 95%, from about 70% to about 95%, from about 80% to about 95%, or from about 85% to about 95%.

Figure 29:
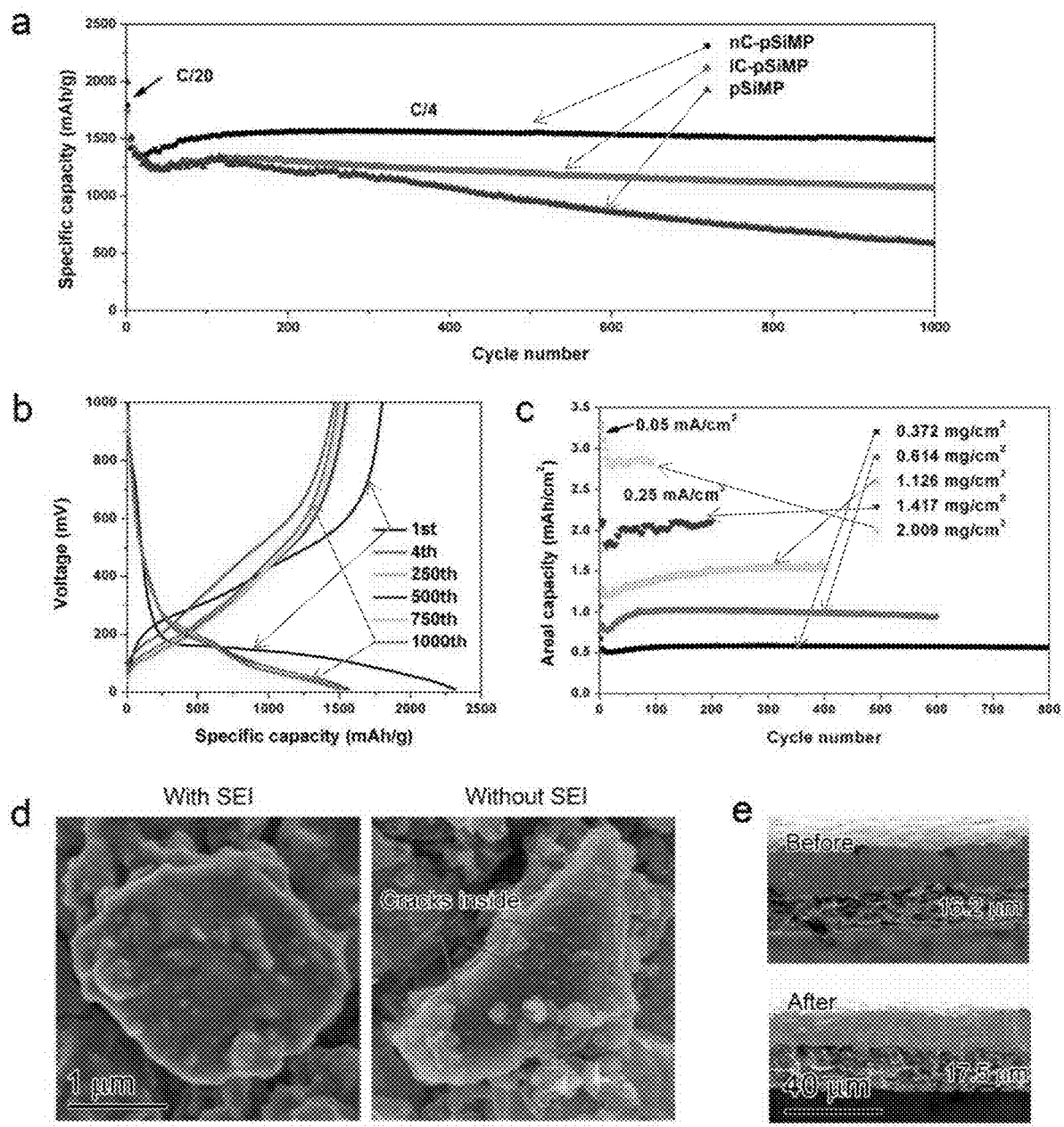
FIG. 29: Electrochemical characterization of nC-pSiMP anodes. All the specific capacities of the anodes are based on the total mass of the active materials (Si and C in the nC-pSiMPs). (a) Reversible delithiation capacity for the first 1000 galvanostatic cycles of the pSiMPs with different coatings. The active material mass loading was about 0.5 mg cm$^{-2}$. The rate was C/20 for the first 3 cycles, and then C/4 for later cycles. 1C=4.2 A g$^{-1}$. (b) Voltage profiles of nC-pSiMPs plotted for the $1^{st}$, $4^{th}$, $250^{th}$, $500^{th}$, $750^{th}$, and $1000^{th}$ cycles. (c) High areal mass loading test (up to about 2.0 mg cm$^{-2}$ active materials) of nC-pSiMPs. All electrodes were cycled at 0.5 mA cm$^{-2}$ for initial three cycles and 0.25 mA cm$^{-2}$ for later cycles. (d) Typical SEM images of nC-pSiMPs after 100 cycles. The arrows show some cracks in the pSiMP. The morphologies of SiMPs were largely unchanged compared to those of the original Si samples. (e) Thickness of the Si electrode before cycling and after lithiation to 0.05 V at $100^{th}$ cycle.

The electrochemical cycling performance of composite electrodes was evaluated using deep charge/discharge galvanostatic cycling from about 1 to about 0.01 V (FIG. 29a-c). As shown in FIG. 29a, an initial reversible capacity of nC-SiMPs reaches about 1798 mAh g$^{-1}$ for a rate of C/20 (1C=4.2 A g$^{-1}$ of active materials). If not mentioned otherwise, the reported capacities are based on the total mass of carbon-coated silicon composites. Because the mass percentage of silicon is about 89% in the composite, the capacity with respect to silicon is about 2020 mAh g$^{-1}$. The volumetric capacity based on electrode volume is determined to be about 1003 mAh cm$^{-3}$ (areal mass loading of about 0.614 mg cm$^{-2}$ with a thickness of about 11 μm), which is larger than the 600 mAh cm$^{-3}$ obtained from state-of-art graphite anodes. From the 4$^{th}$ to 1000$^{th}$ cycle at a rate of C/4, the capacity remains in the range from about 1463 to about 1560 mAh g$^{-1}$, and no noticeable decay is observed. After 1000 cycles, over about 1490 mAh g$^{-1}$ capacity remained, which is about four times the theoretical capacity of graphite. Under the same conditions, iC-pSiMPs (without an internal void space) demonstrated noticeable decay after 200 cycles. Bare pSiMPs decay even more significantly with the capacity retention less than about 45% after 1000 cycles. The voltage profiles of nC-pSiMPs show the typical electrochemical features of silicon (FIG. 29b). The shape of the profiles does not noticeably change from the 250$^{th}$ to the 1000$^{th}$ cycle, indicating stable electrochemical behavior of the non-filling coated structures.

Other reporting of specific capacity is sometimes normalized by a weight of active materials, and a low areal mass loading can achieve a stable cycling. However, a high areal mass loading is desired for the practical application of active materials in a lithium-ion battery. Testing was performed on silicon electrodes with different areal mass loading of composites up to about 2.0 mg cm$^{-2}$ (FIG. 29c). A reversible areal capacity of about 3.22 mAh cm$^{-2}$ is achieved during first deep cycling at 0.05 mA cm$^{-2}$, corresponding to a specific capacity of about 1602 mAh g$^{-1}$ based on the total mass of the Si/C composites. The capacity remains stable during the subsequent 4$^{th}$ to 100$^{th}$ cycles at a high rate of 0.25 mA cm$^{-2}$, and the areal capacity maintains at about 2.84 mAh cm$^{-2}$ after 100 cycles, which is close to the capacity in a commercial lithium-ion battery cell. The electrodes with slightly low areal mass loadings of about 1.417 and about 1.126 mg cm$^{-2}$ offer stable areal capacity of about 2.09 and about 1.53 mAh cm$^{-2}$, respectively. No significant decrease of specific capacity is observed when the areal mass loading increased (about 1505, about 1531, about 1359, about 1474, and about 1413 mAh g$^{-1}$ for the corresponding areal mass loading of about 0.372, about 0.614, about 1.126, about 1.417, and about 2.009 mg cm$^{-2}$), confirming the excellent performance of Si anode originates from the well-designed structures, and is less related to the amount of mass loading.

The exceptional electrochemical stability can be attributed to the nanoscale architecture of a Si—C composite electrode. The void space generated during the thermal disproportionation and etching process retains secondary particles and stabilizes the SEI on their surface. After 100 deep cycles, the morphology of the nC-pSiMPs was examined by SEM images (FIG. 29d). The micron-sized secondary particle can be observed with a thin and substantially uniform SEI layer on the surface. Intact carbon shell with silicon inside is shown after removing the SEI with diluted acid. Interestingly, a few cracks form in pSiMP after cycling as shown by the arrows in FIG. 29d, but the whole pSiMP is still substantially fully wrapped by the carbon. This further indicates that the non-filling coated carbon shell provides structural integrity of pSiMPs during the electrochemical cycling. The thickness of the electrode increases from about 16.2 to about 17.3 μm after 100 deep cycles (FIG. 29e), showing the volume expansion of the anode is modest at about 8%. This small volume change provides the excellent battery performance in high mass loading cells.

Moreover, the void space is formed through thermal disproportionation of SiO and followed by etching away of SiO$_2$. According to the chemical equation 2SiO→Si+SiO$_2$, 2 mole of SiO will generate 1 mole of Si and 1 mole of SiO$_2$. Based on the density of SiO, Si, and SiO$_2$ (about 2.1, about 2.3, and about 2.6 g cm$^{-3}$), it is estimated that about 1.00 cm$^3$ of SiO can generate about 0.30 cm$^3$ of Si and about 0.55 cm$^3$ of SiO$_2$ after thermal disproportionation. Therefore, the SiO microparticle will have a volume decrease of about 15% after heat treatment, which is evidenced by the gap between Si and C shell in TEM image (FIG. 26f). More importantly, the volume ratio of Si to void space is about 3:7 after removing SiO$^2$. This volume ratio allows for volume expansion of Si materials without breaking the carbon shell. In addition, there is no excess void space when the Si—C composite is fully lithiated, providing a high volumetric energy density. No complex designs or sacrificial templates are needed for this well-defined void space, making the preparation procedure scalable and streamlined.

Figure 27:
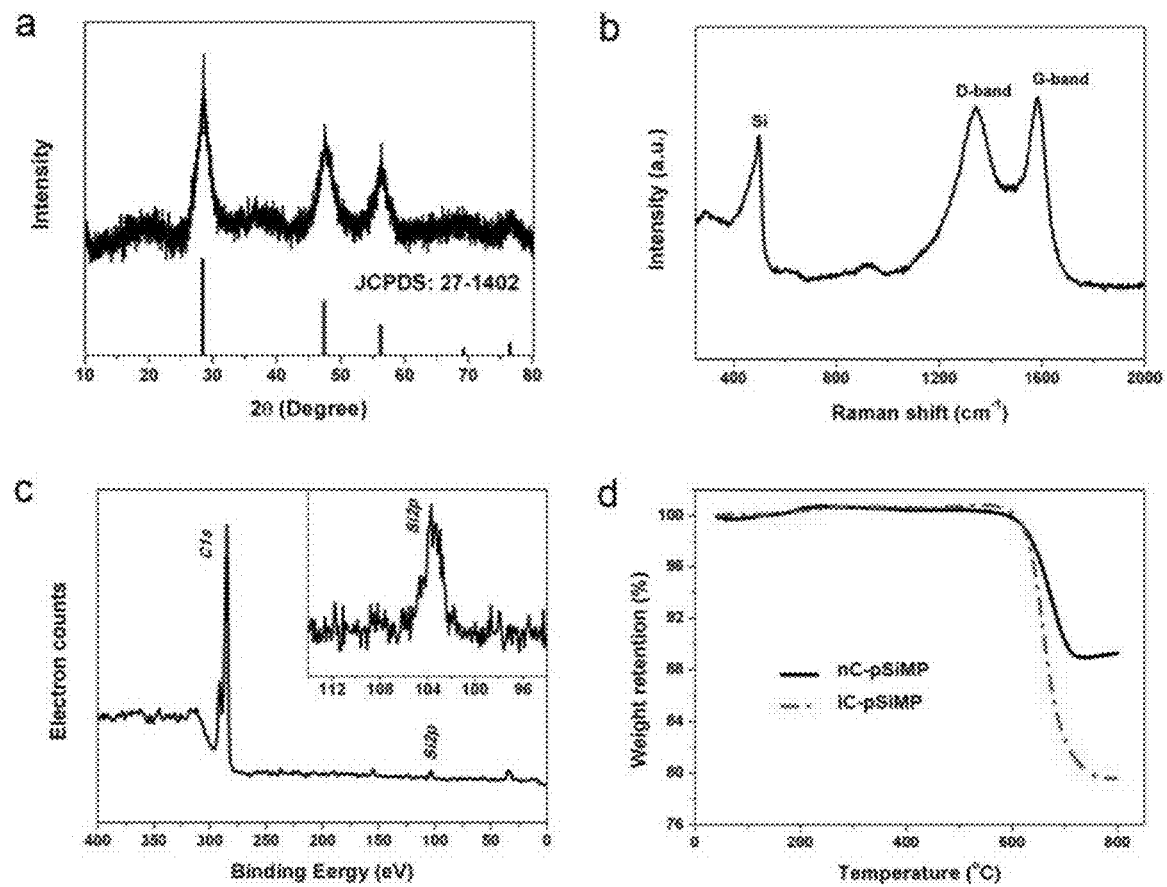
FIG. 27: Characterization of nC-pSiMPs. (a) XRD pattern, where all the peaks are attributed to crystalline Si. (b) Raman spectrum. (c) XPS spectrum. Inset is high-resolution XPS spectrum of the Si2p peaks. The signal of Si is significantly low compared with that of carbon, indicating pSiMPs were completed wrapped by carbon shells. (d) TGA profiles. The dashed curve demonstrates the TGA profile of iC-pSiMPs as a comparison.

Non-filling carbon coating maintains structural integrity of secondary particles, and also decreases the carbon fraction in composites from about 21% to about 11% compared with that of impregnation coating (TGA analysis, FIG. 27d). Low carbon content increases the specific capacity of the composite structures. In addition, low carbon content increases the first cycle CE because amorphous carbon can have dangling bonds that react irreversibly with Li at low potential. As a result, the first cycle reversible capacity of non-filling coated structure reaches about 1798 mAh g$^{-1}$ (or more) with respect to the total mass of Si and C in the composite, while the CE reaches about 78% (or more). As a comparison, an impregnation-coated structure possesses a reversible capacity of about 1716 mAh g$^{-1}$ with about 68% CE in the first cycle.

Thus, additional embodiments of this disclosure have been described as a non-filling carbon-coated SiMP structure to address the issues of material fracture and SEI stability in a Si anode. The thermal disproportionation and etching processes provide the interconnected Si nanoparticles sufficient void space for Si expansion, while the non-filling coated carbon shell maintains the structural integrity of the SiMPs and mitigate against SEI breakup and re-formation. As a result, anodes can be continuously deep cycled up to 1000 times (or more) with a capacity retained of about 1500 mAh g$^{-1}$ (or more). The areal capacity can reach as high as about 2 mAh cm$^{-2}$ (or more) without noticeable capacity decay after 100 cycles. In addition, the material synthesis and electrode fabrication processes are low-cost, scalable, highly robust, and compatible with slurry coating manufacture technology.

Electrochemical Energy Storage Devices

Figure 32:
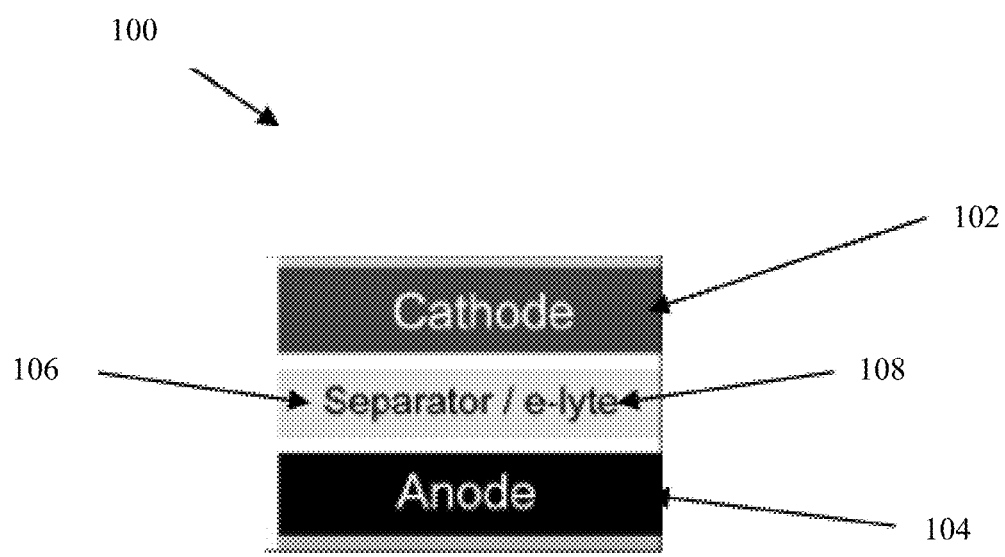
FIG. 32: Schematic of a battery including a Si anode.

The electrodes described herein can be used for a variety of batteries and other electrochemical energy storage devices. For example, the electrodes can be substituted in place of, or used in conjunction with, conventional electrodes for lithium-ion batteries or other types of batteries. As shown in an embodiment of FIG. 32, a resulting battery 100 can include a cathode 102, an anode 104, and a separator 106 that is disposed between the cathode 102 and the anode 104. The battery 100 also can include an electrolyte 108, which is disposed between the cathode 102 and the anode 104. The anode 104 can include encapsulated Si structures as described herein, and the cathode 102 can be a conventional cathode used in Li-ion batteries, Li—O$_2$ batteries, or Li—S batteries. Encapsulated structures of other electrochemically active materials can be included within the cathode 102 of some embodiments.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Si Pomegranate Structures

Materials and Methods:
Methods.
The preparation of Si pomegranate structure is illustrated in FIG. 2a. Si nanoparticles were first coated with a SiO$_2$ layer using a sol-gel method. Next, the aqueous dispersion of Si@SiO$_2$ nanoparticles were mixed with I-octadecene containing about 0.3 wt % emulsifier to form water-in-oil emulsions. After evaporation of water at about 95~98° C., the assembled Si@SiO$_2$ nanoparticle clusters were collected by centrifugation, followed by a heating treatment at about 550° C. for about 1 h in air to remove the organics and condense the cluster structures. After that, a low-cost step-growth polymerization, in the presence of ammonia, generates a resorcinol-formaldehyde resin (RF) layer to wrap the cluster, which was converted into carbon layer under Ar at about 800° C. The thickness of the carbon layer can be tuned by changing the added amount of resorcinol monomer. Finally, SiO$_2$ sacrificial layer was removed with about 5 wt % HF solution to form void space for accommodating the large volume change of Si material during the charge/discharge process.

In-situ TEM experiments were carried out using a specialized dual-probe electrical biasing holder (Nanofactory Instruments, AB). By biasing the working electrode between −2.5 and −3 V versus the counter electrode, Li$^+$ ions flow through the oxide/nitride layer and are reduced at the working electrode, where they react with carbon and alloy with the Si in the pomegranate structure.

The electrochemical properties were evaluated by galvanostatic cycling of coin cells with the Si pomegranate structures as working electrode and lithium foil as the counter/reference electrode. The working electrodes were made by a slurry method using Si pomegranate powders, carbon black, and PVDF binder with a mass ratio of about 8:1:1; the mass loading of active material (Si and C in pomegranate structure) was ~0.2 mg cm$^{-2}$. To prepare high mass loading electrodes, Si pomegranate microbeads and carbon nanotubes (CNTs) (mass ratio of about 7:3) were dispersed in NMP and filtered to make a binder-free microbead/CNT paper, which was cut into discs, with mass loading from about 1-3 mg cm$^{-2}$. The electrolyte was 1.0 M LiPF6 in about 1:1 w/w ethylene carbonate/diethyl carbonate with about 1 vol % vinylene carbonate added to improve the cycling stability. All the cells were cycled between about 0.01 and about 1V versus Li/Li$^+$.

Synthesis of Si@SiO$_2$ Nanoparticles.

In a typical synthesis, about 400 mg SiNPs (~80 nm, MTI, Inc.) were first dispersed in a mixture of about 320 mL ethanol and about 80 mL water by ultrasonication, followed by the addition of concentrated ammonium hydroxide (about 4.0 mL). Under vigorous stirring, about 1.6 mL tetraethoxysilane (TEOS, Aldrich) was added into the dispersion, and the reaction was left at room temperature under stirring overnight. SiNPs coated by SiO$_2$ (Si@SiO$_2$) were collected by centrifugation and washed three times using water. The resulting Si@SiO$_2$ powder was re-dispersed in about 20 mL water (~2 wt % of Si in water).

Microemulsion-Based Assembly of Si@SiO$_2$ Nanoparticles into Clusters.

The obtained water dispersion of Si@SiO$_2$ (about 4 mL) was mixed with about 16 mL 1-octadecene (ODE, Aldrich) solution containing about 0.3 wt % of emulsion stabilizer (amphiphilic block copolymer, Hypermer 2524, Croda USA) and homogenized at about 7000 rpm for about 1 min. The mixture was then heated at about 95~98° C. for about 2 h. After evaporation of water, the Si@SiO$_2$ nanoparticle clusters were collected by centrifugation, and washed with cyclohexane once. The final powder was calcined at about 550° C. for about 1 h in air to remove the organics and condense the SiO$_2$.

Carbon Coating on Clusters.

About 100 mg Si@SiO$_2$ clusters were dispersed in about 30 mL water, and then mixed with about 1 mL cetyl trimethylammonium bromide (CTAB, Aldrich, 10 mM) and about 0.1 mL ammonia (NH$_3$·H$_2$O, Aldrich, 28%) and vigorously stirred for about 20 min to ensure the adsorption of CTAB on the cluster surface. Next, about 40 mg resorcinol (Aldrich) and about 56 μL formaldehyde solution (Aldrich, 37% wt % in $H_2O$) were added and stirred overnight. To control the thickness of the resorcinol-formaldehyde resin (RF) layer, different amount of resorcinol from about 10 mg to about 100 mg were added. X in 'RF-X' in the disclosure denotes X mg resorcinol was used in the coating process. The final RF coated cluster were collected by centrifugation and washed with ethanol three times. The RF shell was carbonized under Ar at about 800° C. for about 2 h with a heating rate of about 5° C. $min^{-1}$.

Silica Layer Etching.

$SiO_2$ sacrificial layer was removed with HF solution to form void space for accommodating the large volume change of Si material during the charge/discharge process. Cluster@RF powders were immersed in about 5 wt % HF aqueous solution for about 30 minutes, followed by centrifugation and ethanol washing three times. The final Si pomegranate powders were obtained after drying in a vacuum oven.

Characterization.

The weight percentage of Si and C in the pomegranate secondary particles was determined from the weight loss curves measured under simulated air atmosphere (20% $O_2$+80% Ar, both are ultra purity grade gases from Airgas) on a Thermal Analysis/Differential Thermal Analysis (TG/DTA) instrument (Netzsch STA 449) with a heating rate of about 5° C./min. Si is slightly oxidized and causes mass increase, while carbon burns away and causes mass decrease. To accurately determine the Si content, a pure Si control sample was measured at the same heating conditions and was subtracted from all the curves. Then Si content in the composite was determined by the lowest point of the subtracted curve. Other characterization was carried out using SEM (FEI Sirion), TEM (FEI Tecnai G2 F20 X-twin), XPS (PHI Versa Probe 5000, Physical Electronics, USA), and XRD (PANalytical X'Pert, Ni-filtered Cu Kα radiation). The cross-sectioned images of Si pomegranate structure after cycling were obtained using a FEI Strata 235B dual-beam SEM/FIB system that combined high-resolution SEM imaging and FIB milling. To expose the interior of a secondary particle, a focused gallium ion beam was used to carry out vertical dissection at the desired locations.

In-Situ TEM Characterization.

In-situ TEM experiments were carried out using a specialized dual-probe electrical biasing holder (Nanofactory Instruments, AB). The movable metallic probes act as current collectors for a nanoscale electrochemical cell that is operated inside the TEM. One probe was a sharpened copper wire (the working electrode) that had the Si pomegranate structures drop-cast onto it. In some cases a thin carbon coating was added to the copper probe for better adhesion of the pomegranates. The second probe was a tungsten wire (the counter electrode) that had a piece of Li metal with a thin (~100 nm) oxide/nitride layer on the surface. The Li metal is the Li source, and the oxide/nitride layer acts as a solid electrolyte layer. Inside the TEM, the probes are positioned so that a single pomegranate structure is in contact with the Li electrode. By biasing the working electrode between −2.5 and −3 V versus the counter electrode, $Li^+$ ions flow through the oxide/nitride layer and are reduced at the working electrode, where they react with carbon and alloy with the Si in the pomegranate structure. Li diffuses through the carbon network to react with the Si. Maintaining this voltage for about 30 min allows for the full lithiation of the pomegranate structure.

Electrochemical Characterization.

Si pomegranate powders, carbon black (Super P, TIMCAL, Switzerland), and polyvinylidene difluoride binder (PVDF, Kynar HSV 900) with a mass ratio of about 80:10:10 were mixed and stirred in N-methylpyrrolidone (NMP) overnight. The slurry was then cast onto a thin copper foil and dried. Prior to cell fabrication, the electrodes were degassed in a vacuum oven at about 100° C. for at least about 4 hr. Coin-type cells (2032) were fabricated inside an Ar-filled glovebox using Li metal foil as counter/reference electrode, along with a Celgard 2250 separator. The electrolyte employed was 1.0 M LiPF6 in about 1:1 w/w ethylene carbonate/diethyl carbonate (BASF) with about 1 vol % vinylene carbonate (Novolyte Technologies) added to improve the cycling stability. Galvanostatic cycling was performed using a BioLogic VMP3 system or an MTI 8 Channels battery tester (0.002-1 mA). If not mentioned otherwise, the galvanostatic voltage cutoffs were about 0.01 and about 1 V vs $Li/Li^+$. The specific capacity was calculated based on the total mass of the Si pomegranate composite. The charge/discharge rate was calculated with respect to the theoretical capacity of Si (about 4200 mAh $g^{-1}$, 1C=4200 mA $g^{-1}$). The Coulombic efficiency was calculated as $C_{dealloy}/C_{alloy}$, where $C_{dealloy}$ and $C_{alloy}$ are the capacity of the anodes during Li extraction and insertion. To characterize the electrode after cycling, cells were discharged to about 1 V and opened. The Si pomegranate electrodes were washed in acetonitrile to remove the electrolyte while keeping the SEI. If desired, the SEI layer was removed by soaking in 0.5 M HCl solution, and followed by rinsing with DI water 3 times.

High Mass Loading Cells.

To prepare high mass loading electrodes, Si pomegranate microbeads and CNTs (mass ratio of about 7:3) were dispersed in NMP and filtered to make a binder-free microbead/CNT paper which was cut into discs. The discs were then sintered at about 500° C. for about 1 hr under Ar at a ramp rate of about 5° C. $min^{-1}$. The mass loading of pomegranate structures ranges from about 1 to about 3 mg $cm^{-2}$. Coin-type cells (2032) were fabricated inside an Ar-filled glovebox using Li metal foil as counter/reference electrode and a Celgard 2250 separator. The electrolyte employed was 1.0 M LiPF6 in about 1:1 w/w ethylene carbonate/diethyl carbonate with about 1 vol % vinylene carbonate and about 10 vol % fluoroethylene carbonate added to improve the cycling stability.

Example 2

Copper-Coated Si Pomegranate Structures

Synthesis of Copper-Coated Si Pomegranates.

Si pomegranate structures were first synthesized similarly as set forth in Example 1. Copper was then coated on the surface of Si pomegranates by electroless plating, as shown in FIG. 17(b). In a typical synthesis, about 100 mg of Si pomegranates, about 40 mg of dopamine hydrochloride (Aldrich) and about 1.0 mL tris-HCl Buffer (about 1 M, pH of about 8.5, Teknova) were added into about 20 mL of distilled water. After stirring for about 20 min, the samples were collected by centrifugation and washed three times with water. About 20 mL of silver nitrate water solution (about 50 mM, Aldrich) was then added into the collected samples and stirred for about 15 min to deposit Ag nanoparticle on the surface as catalytic sites. After removing free silver cations by water washing, the samples were mixed with about 20 mL of copper stock solution, followed by the addition of about 120 mg of dimethylamineborane (Aldrich), and then stirred for about 30 min. The final copper-coated Si pomegranates were collected by centrifugation and annealed at about 400° C. for about 1 hour under Ar atmosphere. The copper stock solution was prepared by dissolving about 9.306 g of ethylenediaminetetraacetic acid tetrasodium salt dihydrate (EDTA, Aldrich), about 4.262 g of $CuCl_2.H_2O$ (Aldrich), and about 3.092 g of boric acid (Aldrich) in about 1000 mL of water, and then using about 1 M NaOH solution to adjust the pH value to about 7.0.

Characterization.

The weight percentage of Si, Cu, and Ag in the copper-coated structures was determined by ICP-MS measurement (Nu AttoM High-resolution ICP-MS). About 3.5 mg sample was first dissolved in about 1 mL of $HNO_3$ (70%) and about 0.2 mL of HF (48%) solution, and then diluted to about 1000 mL with about 2% $HNO_3$ solution. After filtering with a 0.2 μm pore size filter to remove carbon residues, the solution was diluted 100 fold for the ICP-MS measurement. Other characterization was carried out using SEM (FEI Sirion), TEM (FEI Tecnai G2 F20 X-twin), XPS (PHI Versa Probe 5000, Physical Electronics, USA), and XRD (PANalyticalX'Pert, Ni-filtered Cu Kα radiation). The cross-sectioned images of Si pomegranate structure after cycling were obtained using a FEI Strata 235B dual-beam SEM/FIB system that combined high-resolution SEM imaging and FIB milling. To expose the interior of a secondary particle, a focused gallium ion beam was used to carry out vertical dissection at the desired locations.

Electrochemical Measurement.

Copper-coated Si pomegranate powders, carbon black (Super P, TIMCAL, Switzerland), and polyvinylidenedifluo-ride binder (PVDF, Kynar HSV 900) with a mass ratio of about 80:10:10 were mixed and stirred in N-methylpyrroli-done (NMP) overnight. The slurry was then cast onto a thin copper foil and dried. Prior to cell fabrication, electrodes were degassed in a vacuum oven at about 100° C. for at least about 4 hr. If not mentioned otherwise, the areal mass loading of the anode was about 1 mg $cm^{-2}$ based on pomegranate composites. Coin-type cells (2032) were fabricated inside an Ar-filled glovebox using Li metal foil as a counter/reference electrode, along with a Celgard 2250 separator. The electrolyte employed was 1.0 M $LiPF_6$ in 1:1 w/w ethylene carbonate/diethyl carbonate (BASF) with about 1 vol. % vinylene carbonate (Novolyte Technologies) added to improve the cycling stability. Galvanostatic cycling was performed using an MTI 8 Channels battery tester with voltage cutoffs from 0.01 and 1 V versus $Li/Li^+$. The specific capacity was calculated based on the total mass of the Si pomegranate composite. The charge/discharge rate was calculated with respect to the theoretical capacity of Si (4200 mAh $g^{-1}$, 1C=4200 mA $g^{-1}$).

Example 3

Non-Filling Carbon-Coated Porous Si Microparticles

Materials and Methods:

Materials.

Silicon monoxide microparticles (SiO, about 325 mesh), cetyl trimethylammonium bromide (CTAB), ammonia ($NH_3.H_2O$, 28%), resorcinol, formaldehyde solution (37 wt. % in $H_2O$), hydrofluoric acid (48 wt. % in $H_2O$), and ethyl alcohol were purchased from Aldrich Chemical Co. All chemicals were used as received without further treatment.

Synthesis of nC-pSiMPs.

Figure 30:
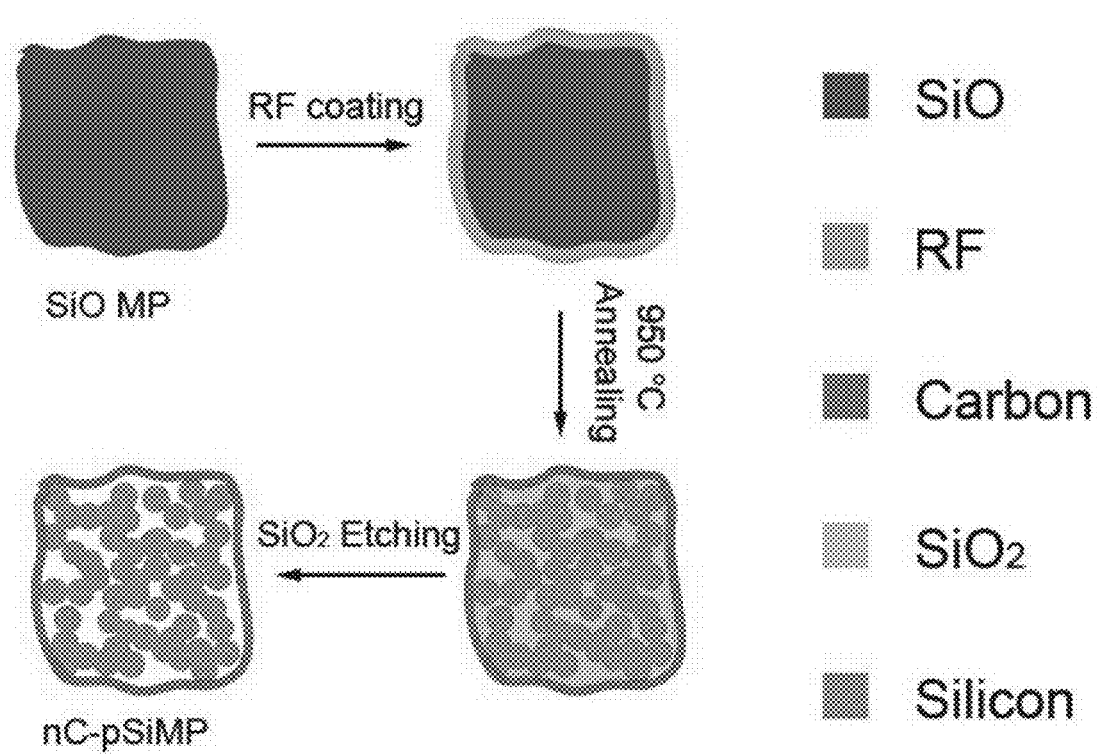
FIG. 30: Schematic of fabrication process of pSiMPs.
Figure 31:
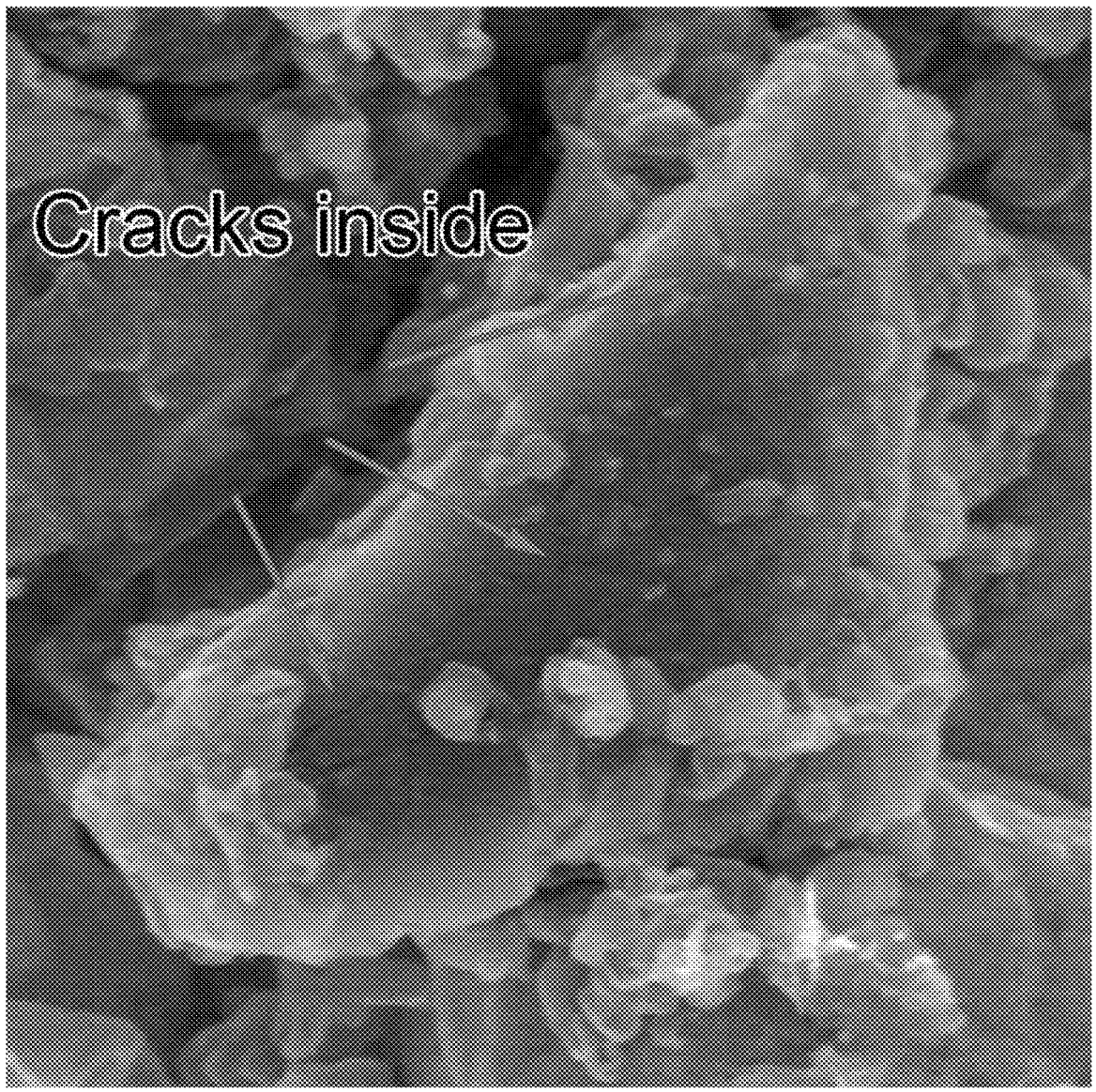
FIG. 31: Typical SEM images of nC-pSiMPs after 100 cycles. The arrows show some cracks in the pSiMP. The morphologies of SiMPs were largely unchanged compared to those of the original SiO microparticles.

The schematic of preparation procedure is shown in FIG. 30. About 1.0 g of silicon monoxide microparticles were dispersed in about 240 mL water, and then mixed with about 8 mL of CTAB water solution (about 10 mM) and about 0.8 mL of ammonia ($NH_3.H_2O$, Aldrich, 28%). After vigorously stirring for about 20 min, about 400 mg resorcinol and about 0.56 mL formaldehyde water solution (37 wt. %) were added into the mixture and stirred overnight. The resorcinol-formaldehyde resin (RF) was coated on SiO microparticles. The RF layer was then converted into a carbon layer under Ar at about 950° C. for about 5 h with a heating rate of about 5° C. $min^{-1}$. During this annealing process, SiO micropar-ticles phase separate to form a $Si/SiO_2$ composite with interconnected Si nanoparticles embedded in a $SiO_2$ matrix due to the disproportionation of SiO. Finally, the composites were mixed with about 10 wt. % HF solution to remove the $SiO_2$ matrix. For the bare porous structure without carbon coating (pSiMPs), SiO was directly heated to 950° C. under the same conditions, and then $SiO_2$ was removed with HF. Impregnation coated samples (iC-SiMPs) can be achieved by coating RF on these bare pSiMPs and followed by a carbonization process.

Characterization.

The weight percentages of Si and C in the carbon-coated pSiMPs were determined from the weight loss curves measured under simulated air atmosphere (20% $O_2$+80% Ar, both are ultra-purity grade gases from Airgas) on a TG/DTA instrument (Netzsch STA 449) with a heating rate of about 5° C./min. SEM and TEM images were taken using a FEI XL30 Sirion SEM (accelerating voltage 5 kV) and a FEI Tecnai G2 F20 X-TWIN (accelerating voltage 200 kV), respectively. Other characterization was carried out by XPS (PHI Versa Probe 5000, Physical Electronics, USA), XRD (PANalytical X'Pert, Ni-filtered Cu Kα radiation), and Raman spectroscopy (531-nm excitation laser, WITEC Raman spectrometer)

In-Situ TEM.

A specialized dual-probe electrical biasing holder (Nano-factory 105 Instruments) was used. By biasing the working electrode between −2.5 and −3 V versus the counter electrode, Li+ ions flow through the lithium oxide/nitride layer and are reduced at the working electrode, where they react with carbon and alloy with the silicon in the coated structures (FIG. 28a). The lithiation time of the carbon-coated porous structures is less than about 3 min (FIG. 28b, c).

Electrochemical Measurement.

To prepare the working electrodes, the various pSiMPs were mixed with carbon black (Super P) and polyvinylidene fluoride binder (about 80:10:10 by weight) in N-methyl-2-pyrrolidinone to form a slurry. This slurry was then coated onto a copper foil using doctor blade and dried under vacuum to form the working electrode. 2032-type coin cells were assembled in an argon-filled glove box using lithium foil as a counter electrode. The electrolyte was 1.0 M LiPF6 in about 1:1 wt/wt ethylene carbonate/diethyl carbonate, with about 1 vol. % vinylene carbonate added to improve the cycling stability. All the cells were cycled between 0.01 and 1 V versus Li/Li+. Specific capacity values were calculated based on the total mass of the composite structures (Si and C in nC-pSiMPs).

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:

1. A battery electrode material, comprising:
   primary particles formed of Si; and
   a secondary particle defining multiple, closed internal volumes,
   wherein the secondary particle consists of a homogeneous amorphous composition,
   wherein a number of the closed internal volumes is at least 100,
   wherein the primary particles are disposed within the closed internal volumes bounded by the homogeneous amorphous composition of the secondary particle,
   wherein a single primary particle is disposed within each closed internal volume,
   wherein, for at least one cycling state of Si, at least one primary particle occupies less than 100% of a respective closed internal volume to define a void space, such that a ratio of a volume of the void space relative to a volume of the primary particle inside the closed internal volume is between 1:2 and 2.9:1, and the void space is devoid of carbon.

2. The battery electrode material of claim 1, wherein the secondary particle has an aspect ratio that is less than 10.

3. The battery electrode material of claim 1, wherein the secondary particle has an outer lateral dimension in the range of 200 nm to 200 μm.

4. The battery electrode material of claim 1, wherein the secondary particle is formed of carbon.

5. The battery electrode material of claim 1, wherein the number of the closed internal volumes is at least 1000 or at least $10^4$, and the secondary particle is ionically conductive with respect to Li ions.

6. The battery electrode material of claim 1, wherein the primary particles are Si nanoparticles.

7. The battery electrode material of claim 1, wherein at least one primary particle has an aspect ratio that is less than 10.

8. The battery electrode material of claim 1, wherein at least one primary particle has an outer lateral dimension in the range of 1 nm to 500 nm.

9. The battery electrode material of claim 1, further comprising a coating of a conductive material covering the secondary particle.

10. The battery electrode material of claim 9, wherein the coating includes nanoparticles formed of the conductive material.

11. The battery electrode material of claim 9, wherein the conductive material includes silver, copper, iron, or cobalt.

12. A battery comprising:
    an anode;
    a cathode; and
    an electrolyte disposed between the anode and the cathode,
    wherein at least one of the anode and the cathode includes the battery electrode material of claim 1.

13. The battery electrode material of claim 1, wherein the ratio of the volume of the void space relative to the volume of the primary particle inside the closed internal volume is at least 1:1.

14. The battery electrode material of claim 1, wherein the ratio of the volume of the void space relative to the volume of the primary particle inside the closed internal volume is at least 2:1.

15. The battery electrode material of claim 1, wherein a weight ratio of Si relative to a combined weight of Si and the secondary particle is in a range of 50% to 95%.

16. The battery electrode material of claim 1, wherein the secondary particle is formed of amorphous carbon.

17. The battery electrode material of claim 1, wherein the secondary particle includes multiple, interconnected shells that define the closed internal volumes.

18. The battery electrode material of claim 17, wherein the shells are amorphous carbon shells.

19. The battery electrode material of claim 17, wherein walls of the shells have a thickness in a range of 1 nm to 100 nm.

* * * * *